United States Patent

Matsumoto et al.

[11] Patent Number: 5,123,622
[45] Date of Patent: Jun. 23, 1992

[54] POWER SEAT LIFTER FOR AUTOMOTIVE SEAT ASSEMBLY

[75] Inventors: Tadashi Matsumoto; Isao Ikegaya; Kuniyuki Sugimoto, all of Shizuoka, Japan

[73] Assignee: Fuji Kiko Company, Ltd., Japan

[21] Appl. No.: 610,018

[22] Filed: Nov. 7, 1990

[30] Foreign Application Priority Data

Nov. 10, 1989 [JP] Japan .................. 1-131223[U]
Nov. 10, 1989 [JP] Japan .................. 1-131224[U]
Nov. 10, 1989 [JP] Japan .................. 1-131225[U]

[51] Int. Cl.⁵ .................................................. F16M 13/00
[52] U.S. Cl. ............................... 248/421; 248/394; 297/330
[58] Field of Search ............... 248/157, 393, 394, 395, 248/396, 398, 424, 421, 422; 297/328, 330, 325, 346; 74/353, 89.15

[56] References Cited

U.S. PATENT DOCUMENTS

| 884,541 | 4/1908 | Tirrill | 200/47 UX |
|---|---|---|---|
| 2,939,513 | 6/1960 | Leslie | 248/394 |
| 3,437,303 | 4/1969 | Pickles | 248/394 |
| 3,894,708 | 7/1975 | Stanley | 248/421 X |
| 3,951,004 | 4/1976 | Heech | 74/89.15 |
| 4,015,812 | 4/1977 | Heech | 248/394 |
| 4,309,015 | 1/1982 | Muhr | 297/330 X |
| 4,432,583 | 2/1984 | Russo | 297/330 |
| 4,470,318 | 9/1984 | Cremer | 74/353 |
| 4,488,699 | 12/1984 | Chevalier | |

FOREIGN PATENT DOCUMENTS

| 436170 | 1/1973 | Australia. | |
|---|---|---|---|
| 0057617 | 8/1982 | European Pat. Off. | |
| 2723550 | 12/1978 | Fed. Rep. of Germany | 248/396 |
| 2901208 | 7/1980 | Fed. Rep. of Germany | 248/396 |
| 2081082 | 2/1982 | United Kingdom. | |

Primary Examiner—J. Franklin Foss
Attorney, Agent, or Firm—Ronald P. Kananen

[57] ABSTRACT

A power seat lifter device for an automotive seat assembly has electrically powered servo systems for adjusting height position at a front end portion and a rear end portion of the vehicular seat. The servo systems are concentrically arranged along one side of the vehicular seat so as to form enough space for permitting lowering of the seat cushion height.

20 Claims, 24 Drawing Sheets

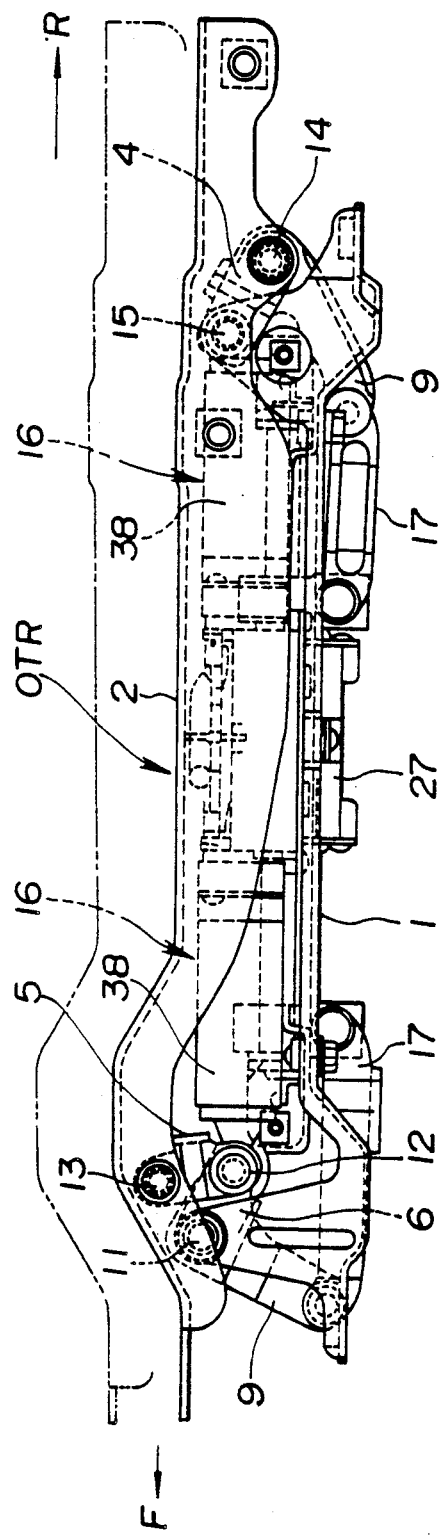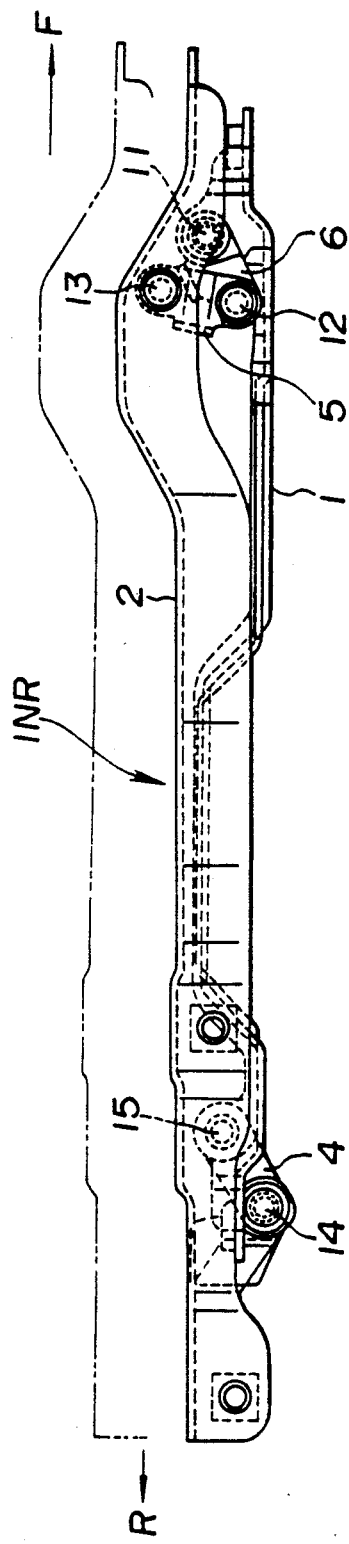

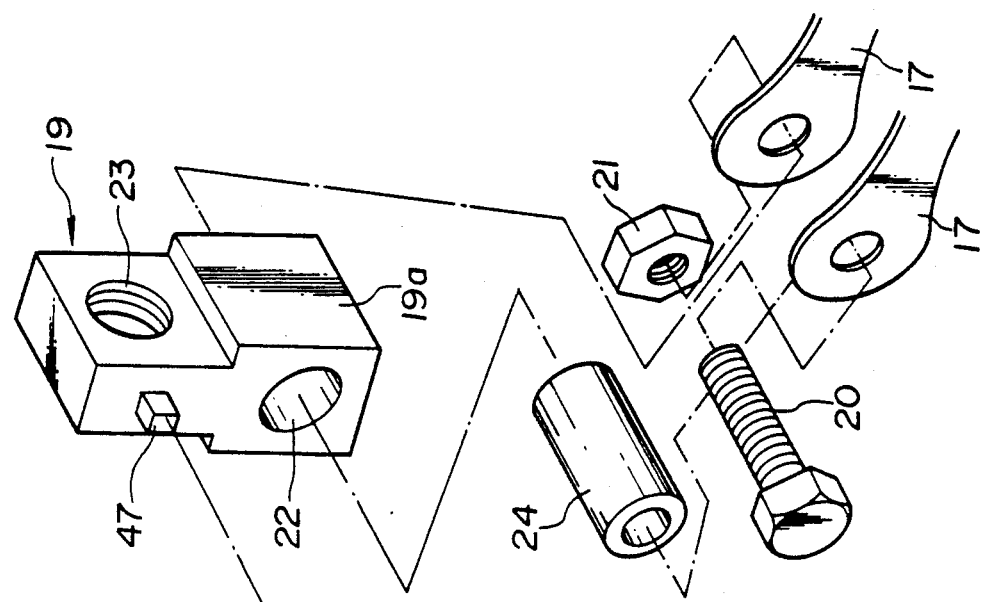
FIG.8
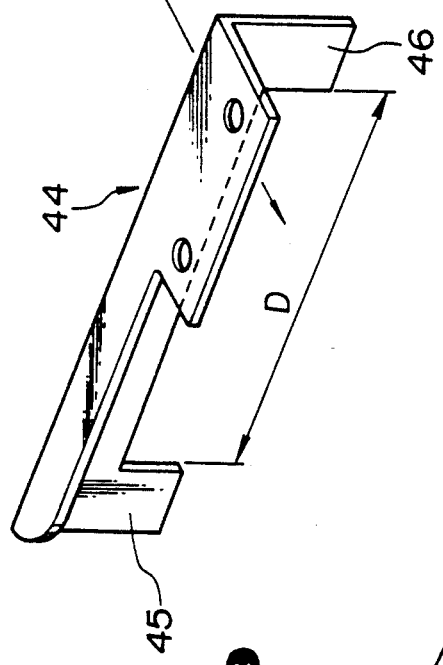
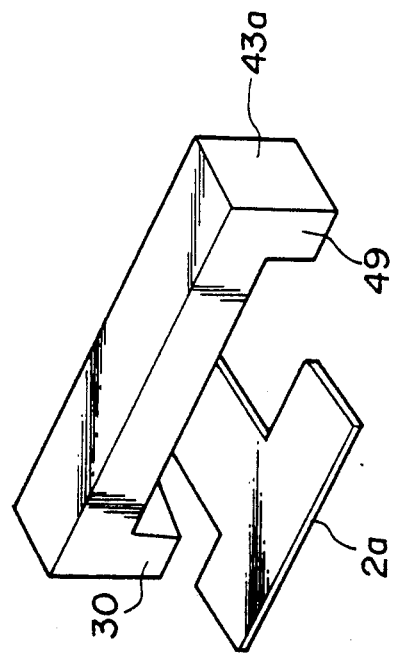
FIG.9

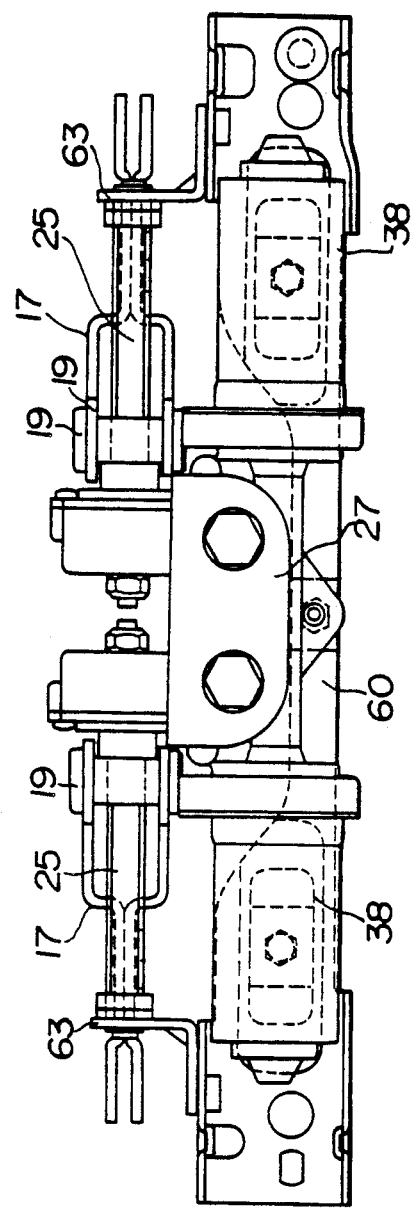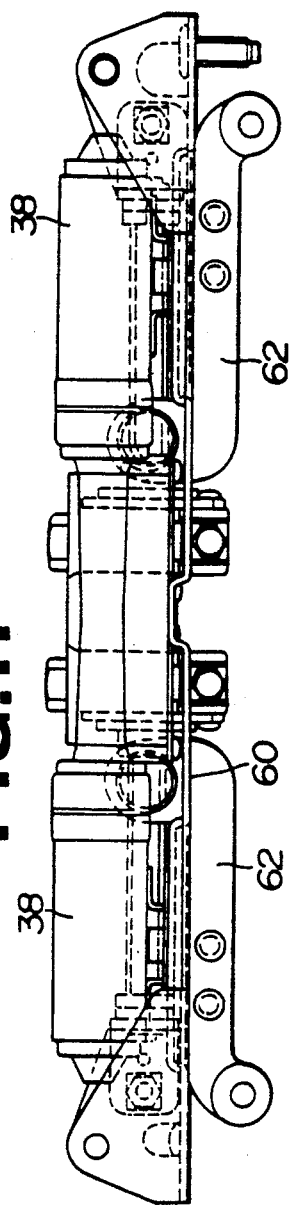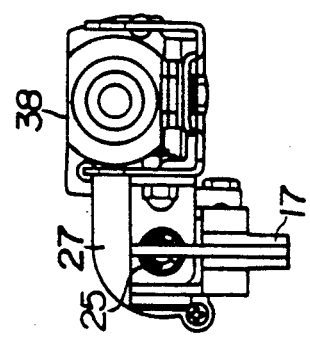

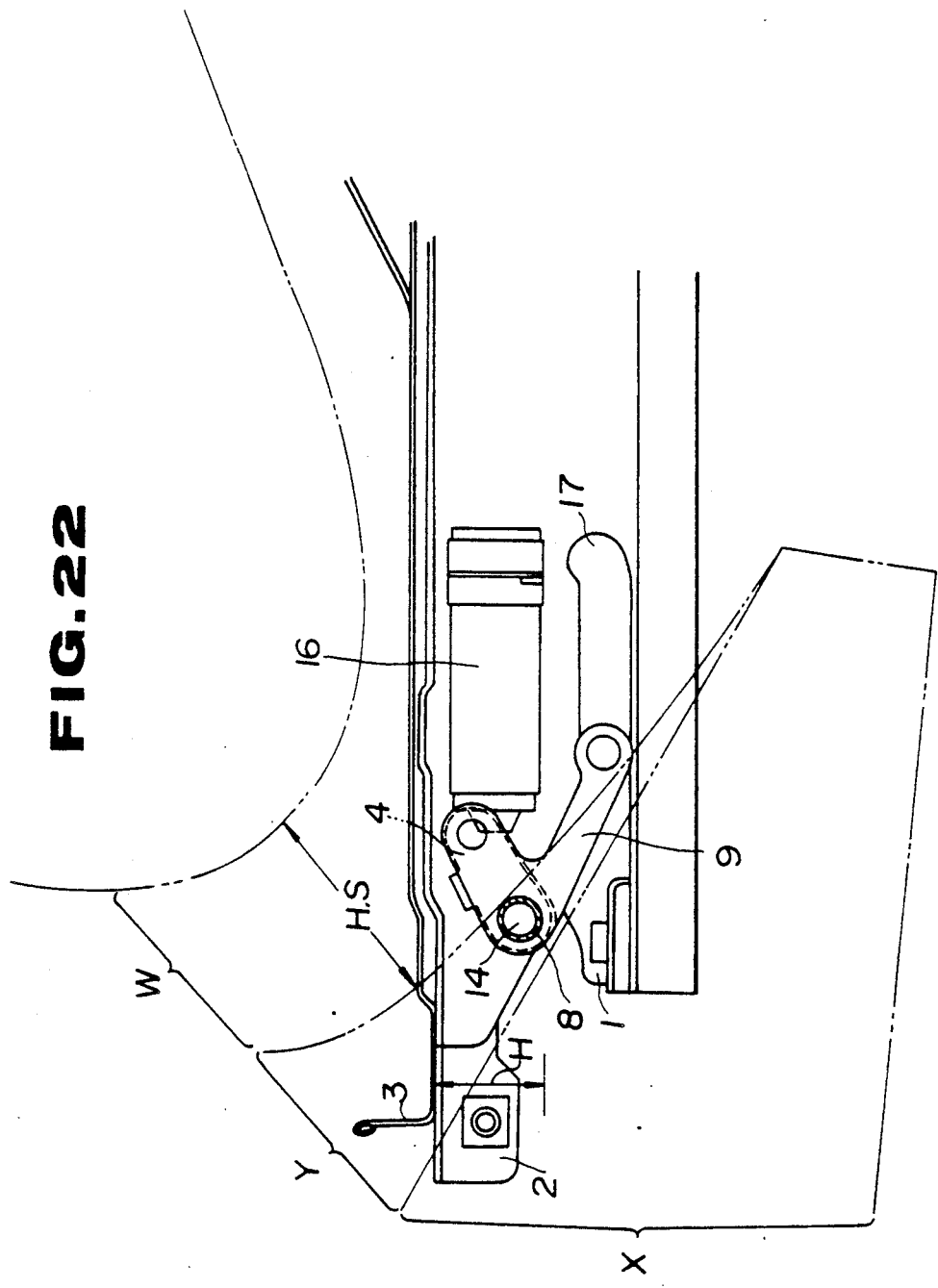

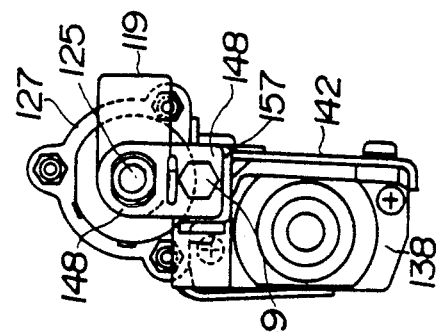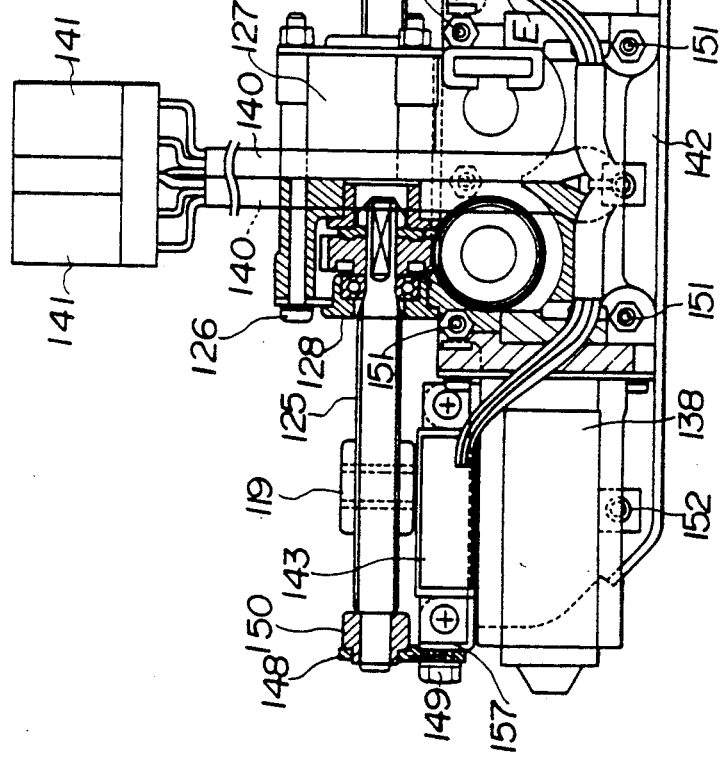

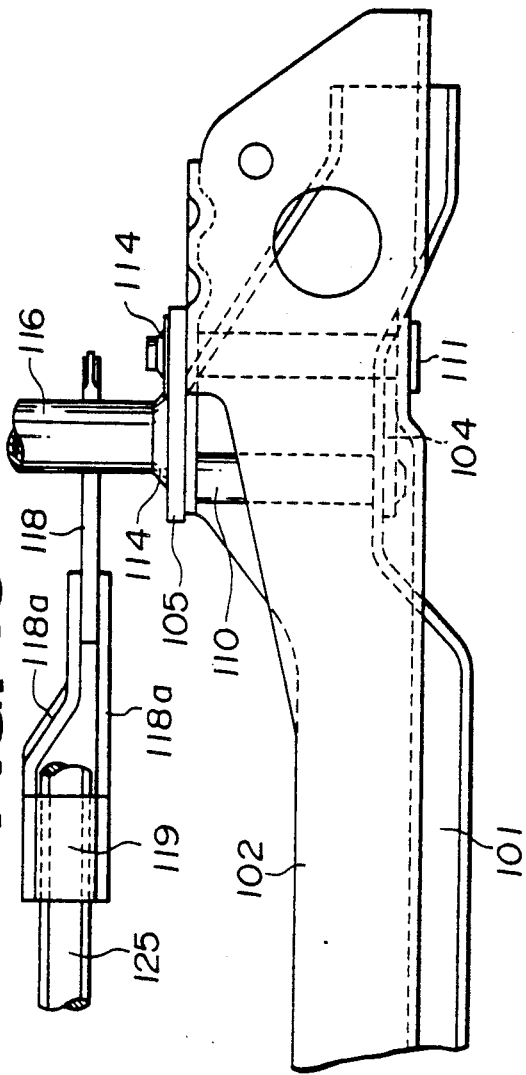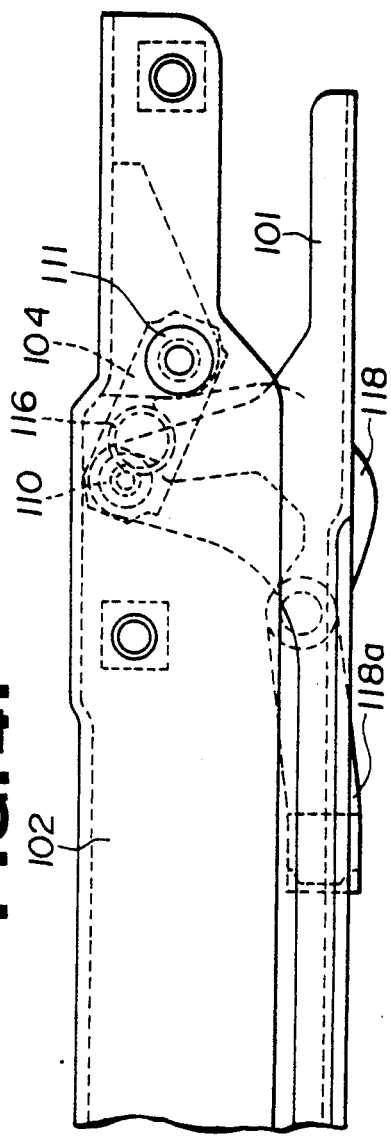

POWER SEAT LIFTER FOR AUTOMOTIVE SEAT ASSEMBLY

BACKGROUND OF THE INVENTION

1. Field of the Invention

The present invention relates generally to an electrically powered seat lifter for a seat assembly to be installed in an automotive vehicle.

2. Description of the Background Art

In the advanced automotive technologies, a seat assembly can be adjusted to various positions utilizing electrically powered servo systems. For instance, a seat back recliner, a seat slide, and so forth often employ such electrically powered servo systems for convenience of adjustment. Similarly, some automotive seat assemblies employ a seat lifter with an electrically powered servo system for adjusting a height position of the seat cushion. The electrically powered servo system for the seal lifter is composed of a plurality of components, such as an electric motor, a gear train and so forth. In general, these components of the servo system are installed beneath the seat cushion.

On the other hand, in the recent days, some types of vehicles require a lower seat position for providing a sporty drive feeling. In order to answer such requirement, the seat cushion is required to be oriented at a lower elevation, at least at the lowermost lift position. The components of the servo system of the seat lifter may then servo to border or restrict a magnitude of lowering of the seat cushion height level. Therefore, for a power seat lifter which incorporates the electrically powered servo switch, the range to lower the seat cushion height level has been strictly limited so as to make it difficult to fully answer the requirement for the lower seat cushion position.

SUMMARY OF THE INVENTION

Therefore, it is an object of the invention to provide a power seat lifter which permits lowering of a seat cushion at a satisfactorily low height level.

In order to accomplish the aforementioned and other objects, a power seat lifter device for an automotive seat assembly, according to the present invention, has an electrically powered servo systems for adjusting height position at front end portion and rear end portion of the vehicular seat. The servo systems are concentrically arranged along one side of the vehicular seat so as to form enough space for permitting lowering of the seat cushion height.

According to one aspect of the invention, a power seat lifter device for an automotive seat assembly, comprises:

a first bracket;

a second bracket supporting a seat cushion assembly of the automotive seat assembly and vertically movable with the seat cushion assembly;

a link mechanism provided between the first and second brackets and pivotally movable for causing vertical displacement of the second bracket relative to the first bracket;

an electric servo motor supported on the first bracket and oriented in a parallel relationship with the first and second brackets for generating a driving torque for adjusting a vertical position of the second bracket relative to the first bracket and thus adjusting height position of the seat cushion assembly;

a gear train associated with the electric servo motor and oriented in the vicinity of the first and second brackets, the gear train converting rotational torque of the electric servo motor into an axial thrusting force directed substantially in parallel to the longitudinal direction of the first and second brackets; and means for converting an axial thrusting force into pivoting force for a pivotally driving the link.

The gear train may include a movement axially movable with the axial thrusting force, the movement being associated with the link mechanism for driving the latter for pivotal motion. The power seat lifter device may further comprise a pair of limit switches respectively oriented in a path of the movement for defining front and rear ends of a motion stroke of the movement.

According to another aspect of the invention, a power seat lifter device for an automotive seat assembly, comprises:

first and second units oriented at respective transverse sides of the automotive seat and extending longitudinally essentially in a parallel relationship to a longitudinal axis of an automotive vehicle, each of the first and second units including a first bracket, a second bracket supporting a seat cushion assembly of the automotive seat assembly and vertically movable with the seat cushion assembly, and a link mechanism provided between the first and second brackets and pivotally movable for causing vertical displacement of the second bracket relative to the first bracket;

an electric servo motor supported on the first bracket of the first unit, and oriented in a parallel relationship with the longitudinal axis of the vehicle for generating a driving torque for adjusting a vertical position of the second bracket relative to the first bracket and thus adjusting a height of position the seat cushion assembly;

a gear train associated with the electric servo motor and oriented in the vicinity of the first and second brackets, the gear train converting rotational torque of the electric servo motor into an axial thrusting force directed substantially in parallel to the longitudinal direction of the first and second brackets;

means for converting an axial thrusting force into a pivoting force for pivotally driving the link; and a transverse member extending between the first and second units for driving the link mechanism in the second unit in synchronism with pivotal movement of the link unit in the first unit.

In such case, the transverse member may be rigidly connected to the link mechanisms in the first and second units for synchronous operation of both link mechanisms. The connecting points at which the transverse member is connected to the link mechanisms of the first and second units are selected at orientations defined by a hip space, a necessary height from a seat cushion frame, and a required leg space for a rear seat.

The gear train may comprise a longitudinally extending screw rod, a nut block engaging with the screw rod for thrusting motion according to rotation of the screw rod, a first intermediate gear rigidly connected to the screw rod for rotation therewith, a second intermediate gear meshing with the first intermediate gear, a third intermediate gear coaxial with the second intermediate gear for rotation therewith, a worm gear meshing with the third intermediate gear and also meshing with an wormed output shaft of the electric servo motor for transmitting rotational torque. The gear train may be generally housed within a gear housing, and the screw rod is extended longitudinally from the gear housing.

The link mechanism may include a link lever pivotable about a pivot supported at two support points.

According to a further aspect of the invention, a power seat lifter device for an automotive seat assembly, comprises:

first and second units oriented at respective transverse sides of the automotive seat and extending longitudinally essentially in a parallel relationship to a longitudinal axis of an automotive vehicle, each of the first and second units including a first bracket, a second bracket supporting a seat cushion assembly of the automotive seat assembly and vertically movable with the seat cushion assembly, and a link mechanism provided between the first and second brackets and pivotally movable for causing vertical displacement of the second bracket relative to the first bracket;

first and second servo systems provided at each of the first units for adjusting a vertical position of the second bracket relative to the first bracket at front and rear end portions, each of the first and second servo systems including:

an electric servo motor supported on the first bracket of the first unit, and oriented in a parallel relationship with the longitudinal axis of the vehicle for generating driving torque for adjusting a vertical position of the second bracket relative to the first bracket and thus adjusting a height position of the seat cushion assembly;

a gear train associated with the electric servo motor and oriented in the vicinity of the first and second brackets, the gear train converting rotational torque of the electric servo motor into an axis thrusting force directed substantially in parallel to the longitudinal direction of the first and second brackets;

means for converting an axial thrusting force into a pivoting force for pivotally driving the link; and a transverse member extending between the first and second units for driving the link mechanism in the second unit in synchronism with pivotal movement of the link unit in the first unit, and the electric servo motors of the first and second servo systems are arranged in alignment in a parallel relationship with the longitudinal axis of the vehicle in an opposing relationship to each other.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 2 is a left side elevation of the first embodiment of the power seat lifter device of FIG. 1;

FIG. 3 is a right side elevational of the first embodiment of the power seat lifter device of FIG. 1;

FIG. 8 is an enlarged exploded perspective view of a nut block employed in the first embodiment of the power seat lifter device of FIG. 1;

FIG. 9 is a perspective view of a modification of a limit switch to be employed in the first embodiment of the power seat lifter device of FIG. 1;

FIG. 10 is a plan view of a modification of the electrically powered servo system to be employed in the first embodiment of the power seat lifter device of FIG. 1;

FIG. 11 is a front elevation of the electrically powered servo system of FIG. 10;

FIG. 12 is a side elevation of the electrically powered servo system of FIG. 10;

FIG. 22 is an enlarged side elevation showing action of a rear link mechanism;

FIG. 27 is a partially sectioned plan view of the servo system employed in the second embodiment of the power seat lifter device of FIG. 24;

FIG. 28 show a major part of a modified framework which can be employed in the second embodiment of the powered seat lifter device;

FIGS. 40 and 41 are an enlarged plan view and a side elevation of an outer rear-side link mechanism employed in the second embodiment of the power seat lifter device of FIG. 24.

DESCRIPTION OF THE PREFERRED EMBODIMENT

Figure 1:
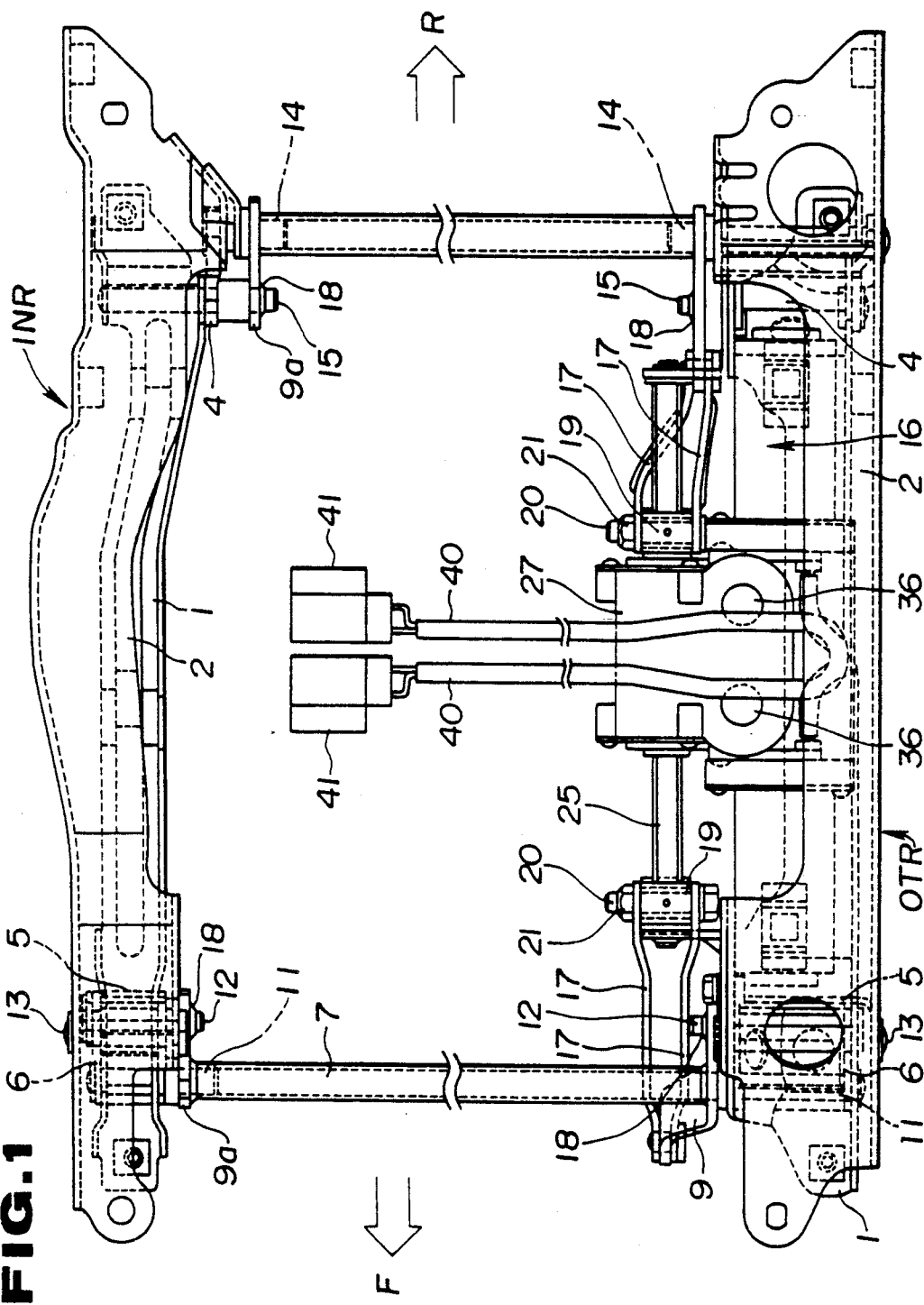
FIG. 1 is a plan view of the first embodiment of a power seat lifter device associated with a framework of an automotive seat assembly, according to the present invention.

Referring now to the drawings, particularly to FIGS. 1, 2 and 3, the first embodiment of a power seat lifter, according to the present invention, generally comprises an outer unit OTR which is to be oriented outer at an side of a vehicular seat close to the vehicular door, and an inner unit INR which is to be oriented at an inner side of the vehicular seat close to the center line of of the vehicular body. In FIG. 1, an arrow F indicates a front side of the seat and an arrow R indicate rear side of the seat. The outer and inner units OTR and INR have leg brackets 1 which are mounted on an upper rail (not shown) of a seat slide system. Side brackets 2 are provided above the leg bracket, which side brackets support a seat cushion frame (not shown). Rear ends of the leg brackets 1 and the side brackets 2 are connected by means of links 4 which are pivotable about pivots 14 and 15. Similarly, the front ends of the leg brackets 1 and the side brackets 2 are connected by means of links 5 and 6 which are pivotably connected via pivot pins 12. The links 5 are pivotably connected to the side brackets 2 for pivotal movement about pivot pin 13. On the other hand, the links 6 are pivotably connected to the leg brackets 1 for pivotal movement about a pivot pin 11. The links 6 in the outer and inner units OTR and INR are cooperatively connected by means of a connecting rod 7. Similarly, the links 4 of the outer end inner units OTR and INR are connected to each other by means of a connecting rod 8.

The links 6 and 4 in the outer unit OTR are cooperated with actuation levers 9 which are driven independently of the other by means of an electrically powered servo system. Each of the actuation levers 9 is formed into essentially L-shaped or V-shaped configuration and is associated with an electrically powered drive unit 16 via essentially bifurcated connecting lever 17. The respective actuation levers 9 are rigidly connected to pivots 11 and 14 for driving the connecting rods 7 and 8 in synchronism with pivotal motion of the links 6 and 4. In practice, the actuation levers 9 may be welded onto respective outer ends of the connecting rods 7 and 8. The actuation levers 9 are connected to pivots 12 and 15 of the links 6 and 4. Bush nuts 18 are fitted on the axial ends of the pivots 12 and 15 for retaining the actuation levers 9. Actuation levers 9a are also rigidly connected to the inner ends of the connecting rods 7 and 8 at the identical angular position to those of the actuation levers 9. Therefore, the actuation levers 9a are pivotally operated in synchronism with an associated one of the actuation levers 9 via the connecting rods 7 and 8. Similarly to the actuation levers 9, the actuation levers 9a are connected to the pivots 12 and 15 in the inner unit INR for cooperation with the links 6 and 4. The bush nuts 18 are fitted onto the axial ends of the pivots 12 and 15 for retaining the actuation levers 9a.

To the connecting levers 17, nut block assemblies 19 are secured by means of fixing bolts 20 and fastening nuts 21. Detail of the each nut block assembly 19 is illustrated in FIG. 8 in the form of an exploded perspective view. As can be seen from FIG. 8, the nut block assembly 19 includes a nut block 19a which is formed into reversed T-shaped cross-section of synthetic resin. The nut block 19a is formed with a longitudinally extending through hole 22 and a threaded hole 23 which is oriented transversely to the through hole 22. A collar 24 is inserted into the through hole 22. The end portions 17a and 17b of the bifurcated legs of the lever 17 is placed opposing both longitudinal ends of the nut block 19a with aligning openings 17c thereof with the through holes 22. The fixing bolt 20 extends through the openings 17c and the collar 24. Therefore, the nut block 19a is connected to the lever 17 by beams of the fixing bolt 20 and the fastening nut 21.

The threaded hole 23 receives therethrough a screw bolt rod 25 which has a threaded periphery. The screw bolt rod 25 is rotatably supported at one end by a bearing 26 which is rigidly secured on the leg bracket 1. The other end of the screw bolt rod 25 is inserted into a gear housing 27 which is also rigidly secured on the leg bracket 1.

Figure 4:
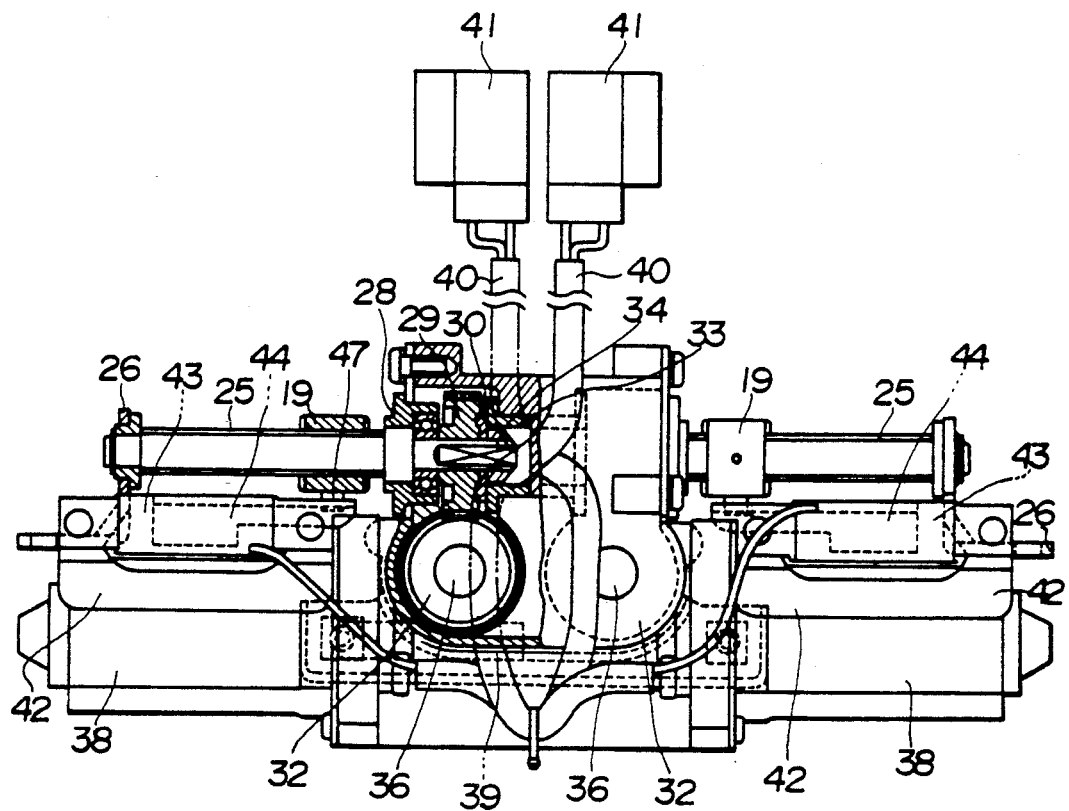
FIG. 4 is an enlarged plan view of an electrically powered servo system employed in the first embodiment of the power seat lifter device of FIG. 1.
Figure 6:
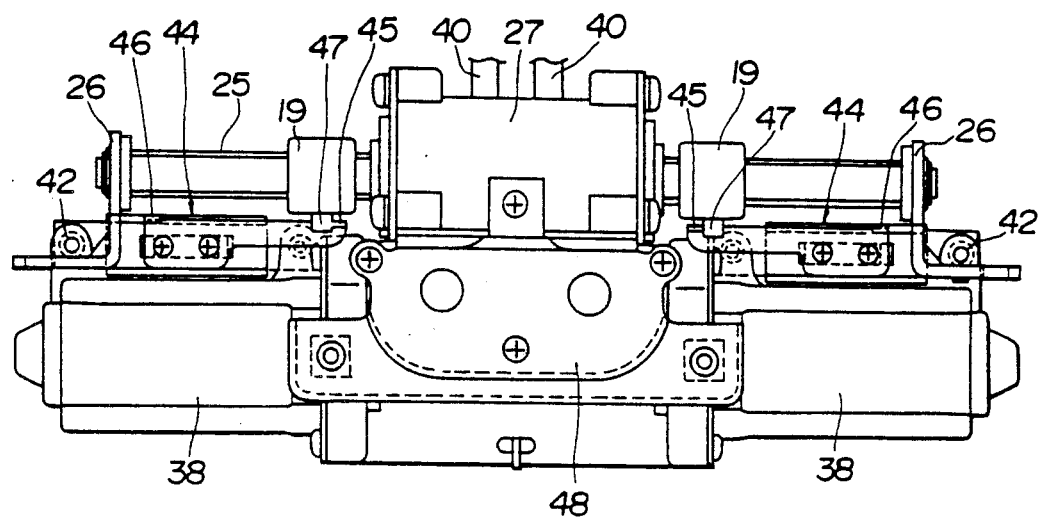
FIG. 6 is an enlarged plan view of the electrically powered servo system of FIG. 4.
Figure 7:
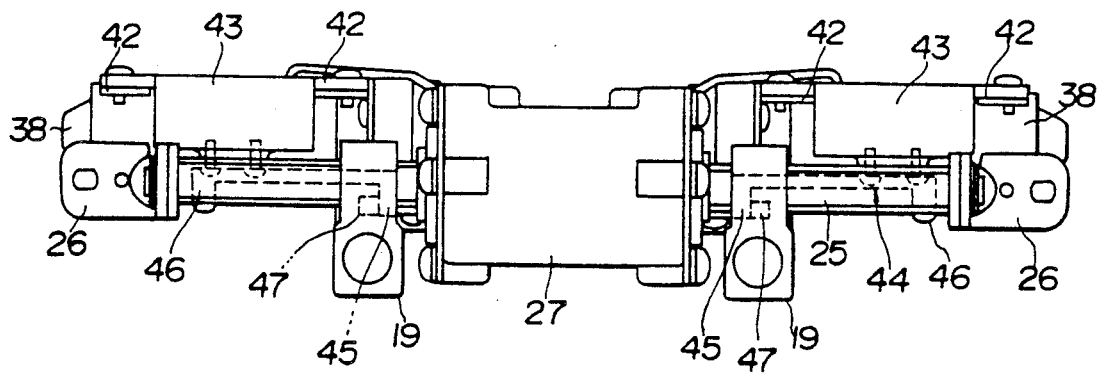
FIG. 7 is an enlarged bottom view of the electrically powered servo system of FIG. 4.
Figure 13:
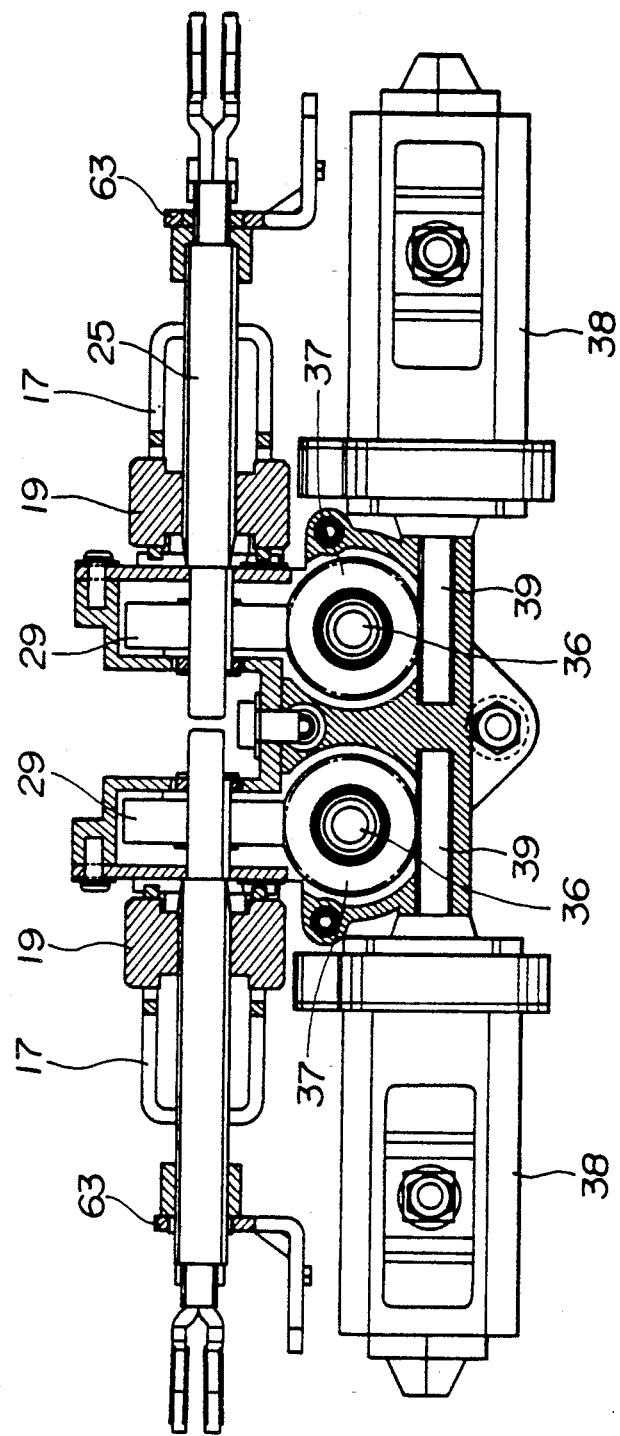
FIG. 13 is an enlarged section of the electrically powered servo system of FIG. 10.
Figure 14:
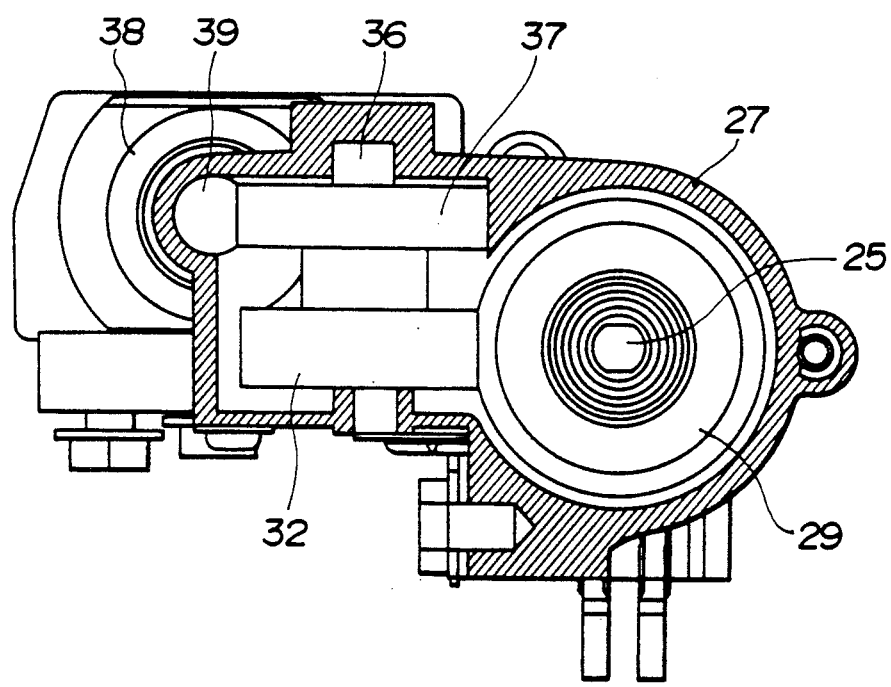
FIG. 14 is an enlarged section of the electrically powered servo system of FIG. 10.
Figure 15:
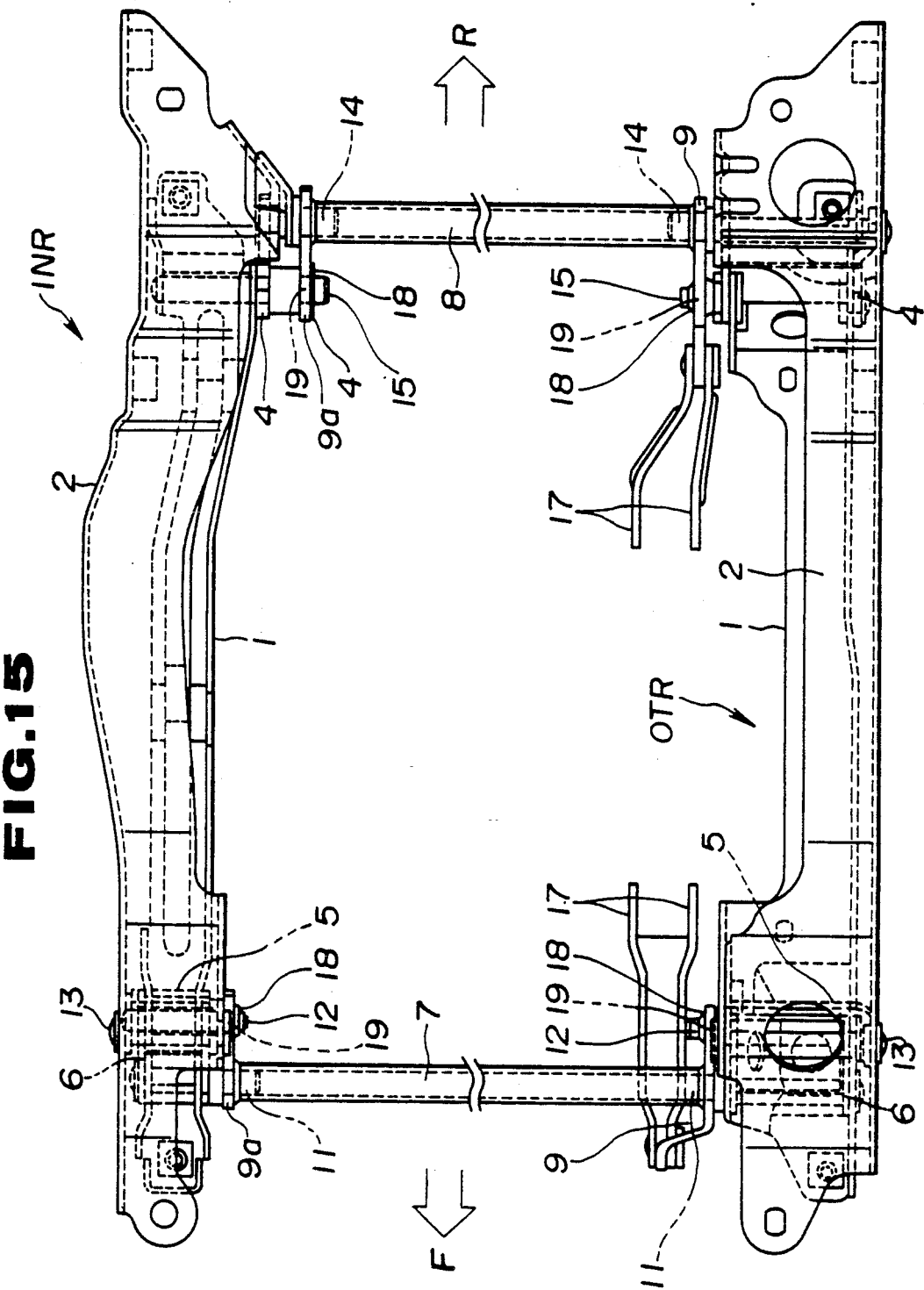
FIG. 15 is a plan view showing framework of the automotive seat for which the preferred embodiment of the electrically powered servo system is to be combined to form the preferred embodiment of the seat lifter device.
Figure 16:
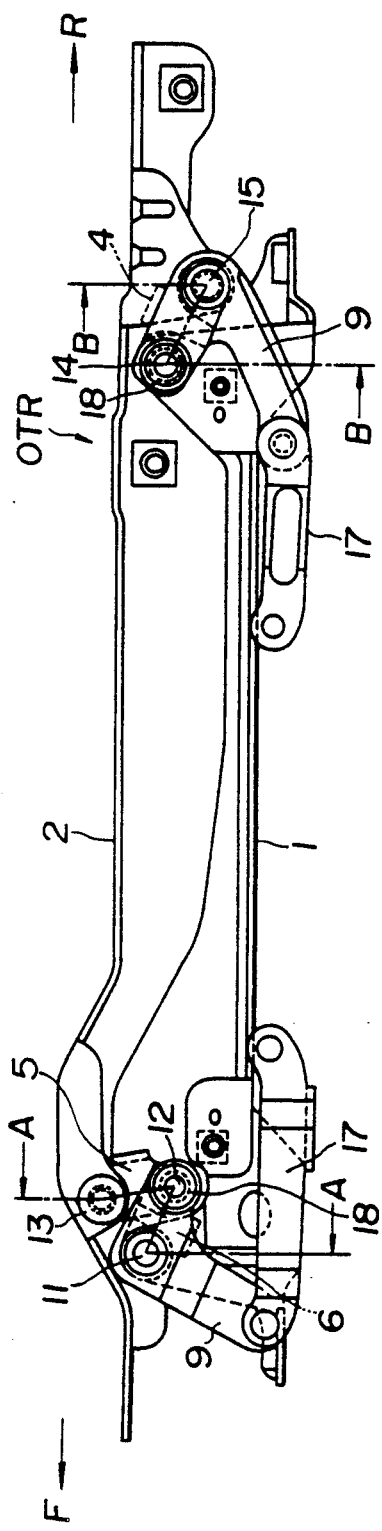
FIGS. 16 and 17 are respective views of the left and right side elevation of the framework of FIG. 15 and showing action of a link mechanism associated with the seat lifter device.
Figure 17:
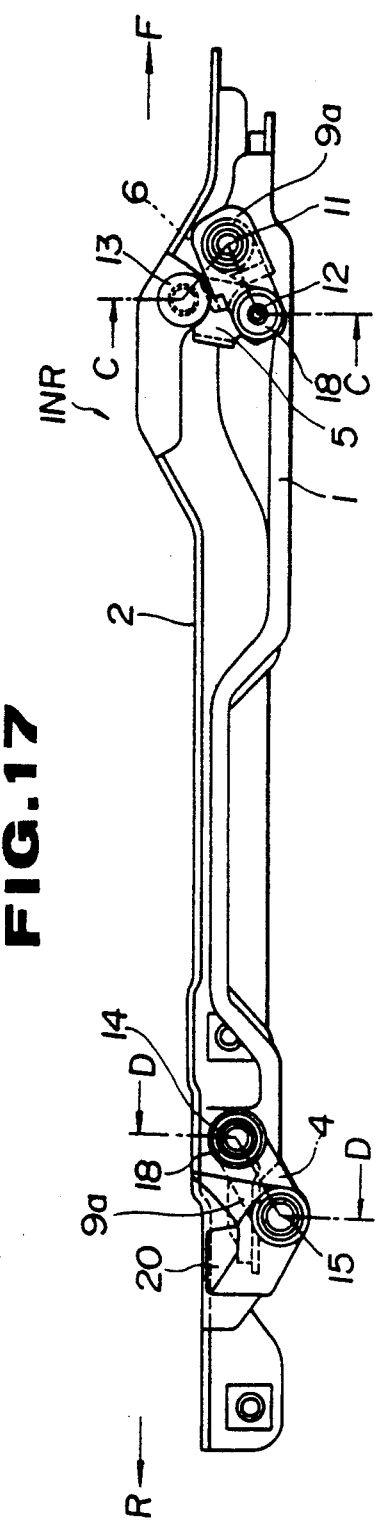

As shown in FIG. 4, a bearing 28 is fixed onto the gear housing 27. The bearing 28 rotatably supports the other end of the screw bolt rod 25. A gear 29 is rigidly fitted onto the end of the screw bolt rod 25 for rotation therewith by means of a washer 30 and a fastening nut 34. The end of the screw bolt rod 25 extending through the gear 29 and the fastening nut 34 are received in a bushing cap 33 fixed onto the gear housing 27. The gear 29 meshes with a screw gear 32 which is supported on a gear shaft 36. The gear shaft 36 is rotatably supported on the gear housing 27.

Figure 5:
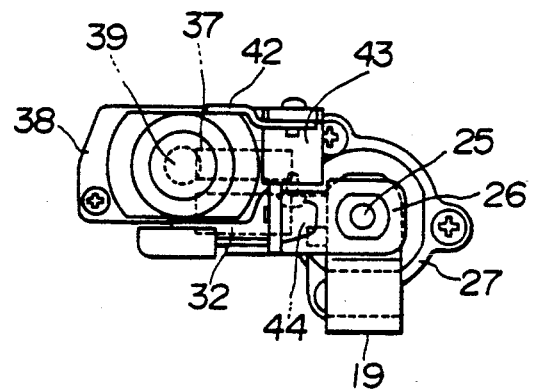
FIG. 5 is an enlarged side elevation of the electrically powered servo system of FIG. 4.

As shown in FIG. 5, a worm gear 37 is also rotatably supported on the rear shaft 36 for co-rotation with the screw gear 32. The worm gear 37 meshes with a worm output shaft 39 of an electric servo motor 38 which is rigidly secured on the gear housing 27. As can be clear from FIG. 4, a pair of the electric servo motors 38 are provided in alignment and in an opposing arrangement. Respective of the electric servo motors 38 are connected to an external seat lifter control circuit via lead wires 40 and connectors 41.

As shown in FIGS. 4 through 7, brackets 42 are fixedly mounted on the gear housing 27. The brackets 42 support limit switches 43. The limit switches 43 have actuation strips to which stoppers 44 are connected. As shown in FIG. 8, the stopper 44 is made from a plain plate by bending and is provided a pair of engaging strips 45 and 46. The stopper 44 is arranged in a parallel relationship with the screw bolt 25. The distance D between the engaging strips 45 and 46 corresponds to the stroke of axial motion of the nut block 19. Therefore, the mutually opposing edges of the engaging strips 45 and 46 define front and rear ends of axial motion of the nut block 19. The nut block 19 is provided with a projection 47 extending into the space defined between the strips 45 and 46.

A cover plate 48 is provided for covering the upper end of the gear housing 27. If necessary, an extension can be provided for the cover plate to support the limit switch 43 in place of the bracket 42.

FIG. 9 shows a modification of installation of the limit switch for defining the motion stroke of the nut block 19. In this modification, an essentially T-shaped strip 42a is fixed to the housing of each electric servo motor 38. The actuation strip 43 of the limit switch 43a is mounted on one end of the strip 42a. As can be seen, the limit switch 43 is provided with a pair of legs 49 and 50 which are distanced in a distance corresponding to the motion stroke of the nut block 19.

As shown in FIGS. 15 through 22, the framework employed in the shown embodiment of the power seat lifter device, according to the invention, forms an essentially square or rectangular frame construction with the leg brackets 1 and the side brackets 2 of the outer and inner units OTR and INR, together with connecting rods 7 and 8 extending essentially transverse to the leg and side brackets. As set forth above, the both ends of the connecting rods 7 and 8 which form part of the framework are connected to pivotal levers 9 and 9a. As particularly shown in FIGS. 18 and 19, respective of the leg brackets 1 and the side bracket 2 are formed into essential channel or C-shaped close sections. Pivots 11 and 14 are supported on these brackets 1 and 2 at both ends thereof. As seen, the pivots 11 and 14 are extended from the side wall section of the leg and side brackets 1 and 2 at one side. The connecting rods 7 and 8 engage with these extended portions of the pivots 11 and 14. Similarly, the pivot 12 is extended through the levers 5 and 6 and extended toward one side. To the extended portion of the pivot 12, the actuation lever 9 is connected. On the other hand, the pivot 15 is fitted to one side wall of the lever 4 overlapping with the side wall section of the leg bracket 1. To the extended end portion of the pivot 15, the lever 9 for actuating the rear link mechanism is connected.

Figure 20:
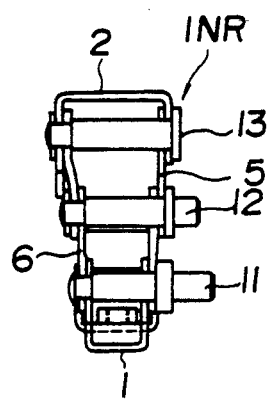
FIGS. 18, 19, 20 and 21 are sections taken along lines A—A, B—B, C—C and D—D of FIGS. 16 and 17.
Figure 18:
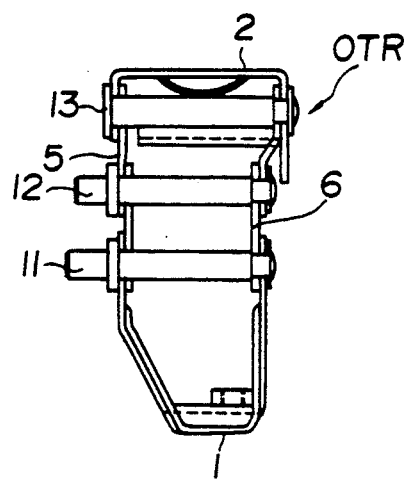
Figure 21:
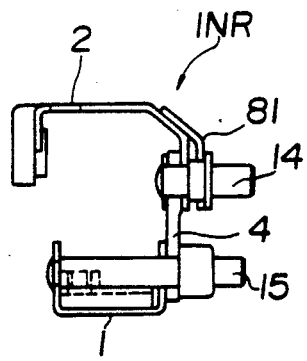
Figure 19:
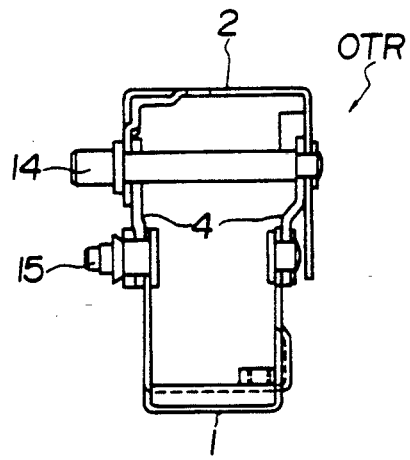

On the other hand, FIGS. 20 and 21 show sections in the inner unit INR. Similarly to the foregoing, the pivot 11 extends toward one side from the overlapping side walls of the leg bracket 1 and the link 6. Also, the pivot 12 extends from one side of the overlapping side walls of the links 5 and 6. To the extended end of the pivot 11, the connecting rod 7 is engaged. On the other hand, to the extended end, the actuation lever 9a for actuating the front side link mechanism of the inner unit INR is engaged. In the similar manner to the above, the connecting rod 8 and the actuation lever 9a are connected to the extended ends of the pivots 14 and 15. In contrast to the outer unit OTR, the pivot 14 is supported at one side of the overlapping walls of the link 4 and the side brakes 2, and the pivot 15 is supported by both side walls of the leg bracket 1 and the link 4.

In the shown construction, as shown in FIG. 22, the axial position of the connecting rod 8 is offset from the pivoting center of the link 4 rearwardly. The position of the connecting rod 8 is selected within a vacant space Y which is determined by a range W which is required to provide sufficient hip space (H. S.), a necessary height H from the seat cushion frame, and a necessary height X for providing sufficient leg space for the rear seat occupant. By orienting the connecting rod 8 at such vacant space range Y, interference of the connecting rod 8 to the lifting up and down motion of the seat cushion can be minimized.

In the shown construction, since the connecting rods 7 and 8 can be assembled with the leg and side brackets 1 and 2 without requiring welding, assembling work can be simplified. Furthermore, with the shown construction, since no element will subject to heat in the welding, thermal distortion wall not affect maintaining a small tolerance.

As can be appreciated, in the shown embodiment, the servo system for electrically driving the power seat lifter device is concentrically provided with the outer unit OTR, and a large clearance is formed beneath the mid portion of the seat cushion so as to permit satisfactorily lowering the seat level.

Operation of the aforementioned construction of the first embodiment of the power seat lifter device will be discussed herebelow. When the driver current is applied to one of or both of the electric servo motors 38 independently of each other, the screw bolt rods 25 are rotatingly driven. According to rotation of the screw bolt rods 25, the nut blocks 19 are driven in a forward or a rearward direction according to the rotating direction of the screw bolt rods 25. Assuming that the nut block 19 is driven to pull the lever 17 rearwardly, the actuation lever 9 is driven to pivot in a counterclockwise direction about the pivot 11. Accordingly, the leg of the actuation lever 9, which carries the pin 12 pivots in a counterclockwise direction. According to counterclockwise pivotal movement of the pin 12, the link 6 is pivotally moved in a counterclockwise direction. This pivotal movement of the link 6 causes clockwise motion of the link 5 to lift the side bracket 2 upwardly.

At the end of the stroke, the projection 47 comes into contact with the engaging strip 46. When the projection 47 contacts with the engaging strip 46, the limit switch 43 is turned OFF to cause termination of the driving operation of the electric servo motor 38. Therefore, the seat cushion is stopped at the uppermost lift position.

When the electric servo motor 38 is driven in the reverse direction, the nut block 19 is driven rearwardly to cause clockwise pivotal movement of the lever 17. Therefore, all components of the power seat lifter device shift in the opposite direction to that in the lifting up operation set forth above. As a result of operation in the opposite direction, the seat cushion is lowered to the lowermost elevation, at which the projection 47 comes into contact with the engaging strip 45.

FIGS. 10 to 14 show a modification of the electrically powered servo system to be employed in the shown embodiment of the power seat lifter device, according to the present invention. In the shown embodiment, the components common to the former embodiment will be presented by the same reference numerals.

In the shown embodiment, the gear housing 27 and the electric servo motors 38 are mounted on a mounting bracket 60. Similarly to the former embodiment, the gear housing 27 houses two pairs of warm gears 32 and 37 in coaxial relationship to each other. The worm gear 37 meshes with an output worm shaft 39 of the electric servo motor 38. On the other hand, the worm gear 32 meshes with gear 29 which is rigidly mounted on the end of the screw rod 25.

Nut blocks 19 have threaded holes to which the screw rods 25 engages. Each nut block 19 carries levers 62. The levers 62 are pivotable about associated one of the nut blocks 19. The levers 62 are thrustingly supported by means of support brackets 63 which are secured on the mounting bracket 60. At the front and rear ends remote from associated one of the nut blocks 19, the levers 62 are connected to the links for pivotally driving the latter for causing variation of the height position of the seat cushion.

With the shown modification, substantially equivalent advantages achieved by the former embodiment can be achieved.

Figure 23:
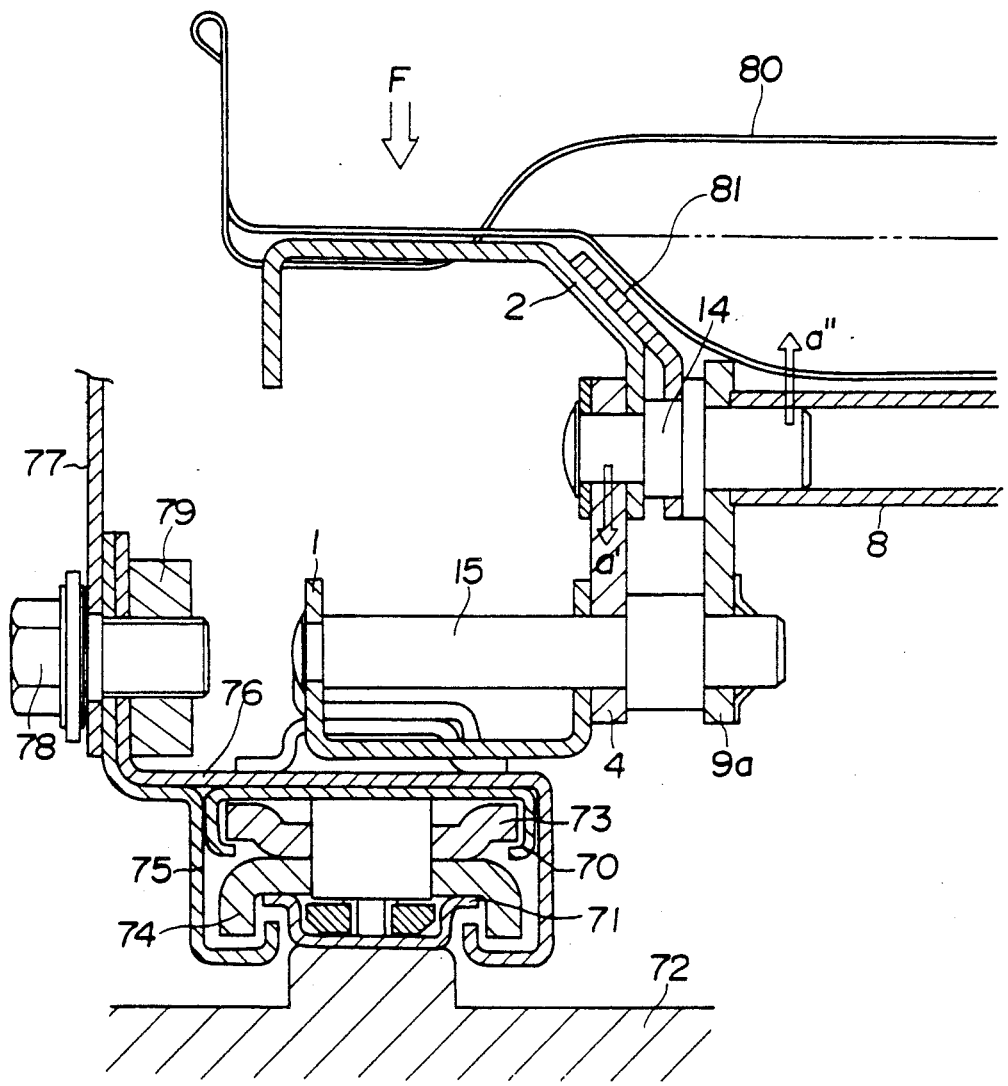
FIG. 23 is an enlarged transverse section of the framework associated with the seat lifter device.
Figure 24:
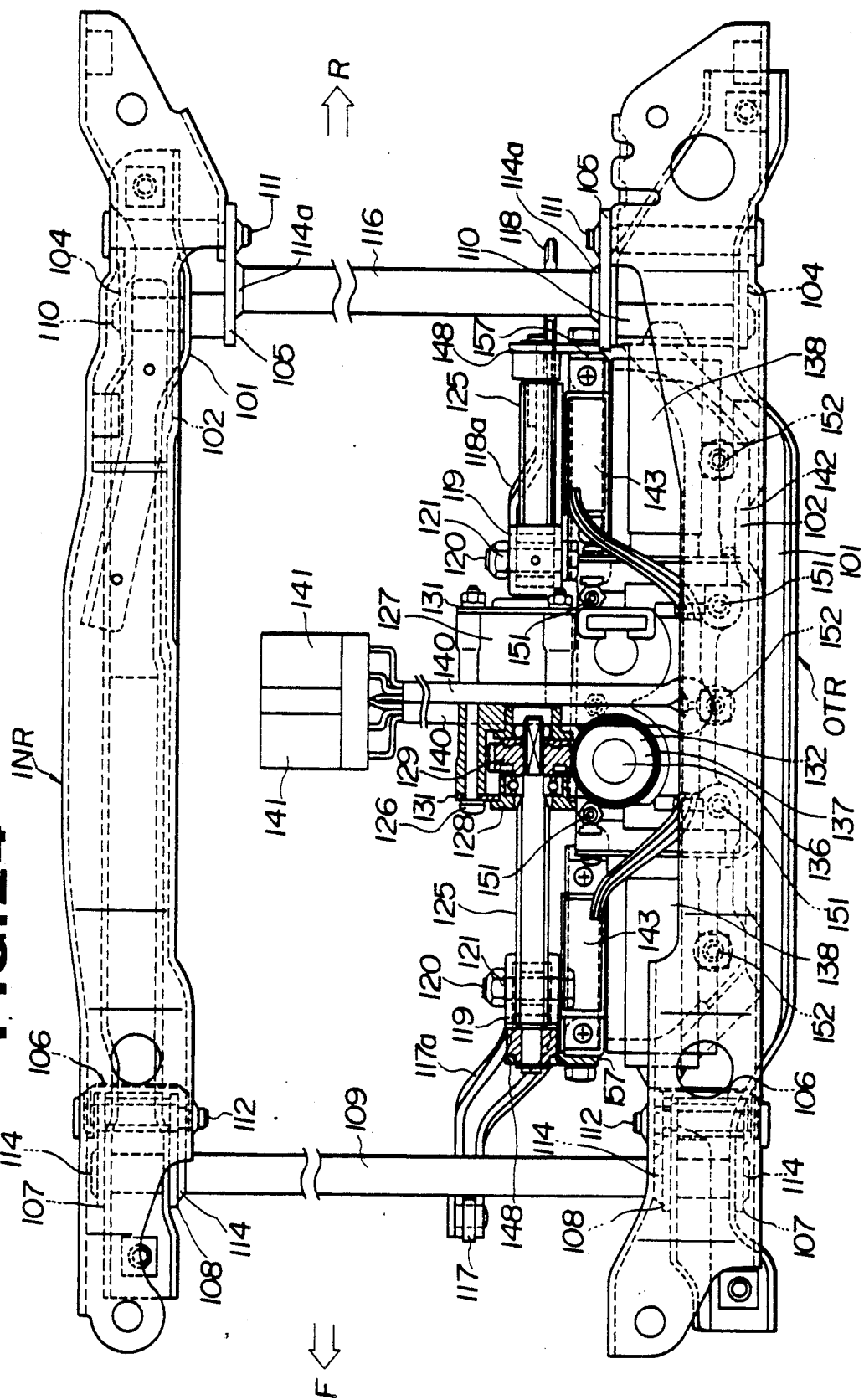
FIG. 24 is a plan view of the second embodiment of a power seat lifter device according to the present invention.
Figure 25:
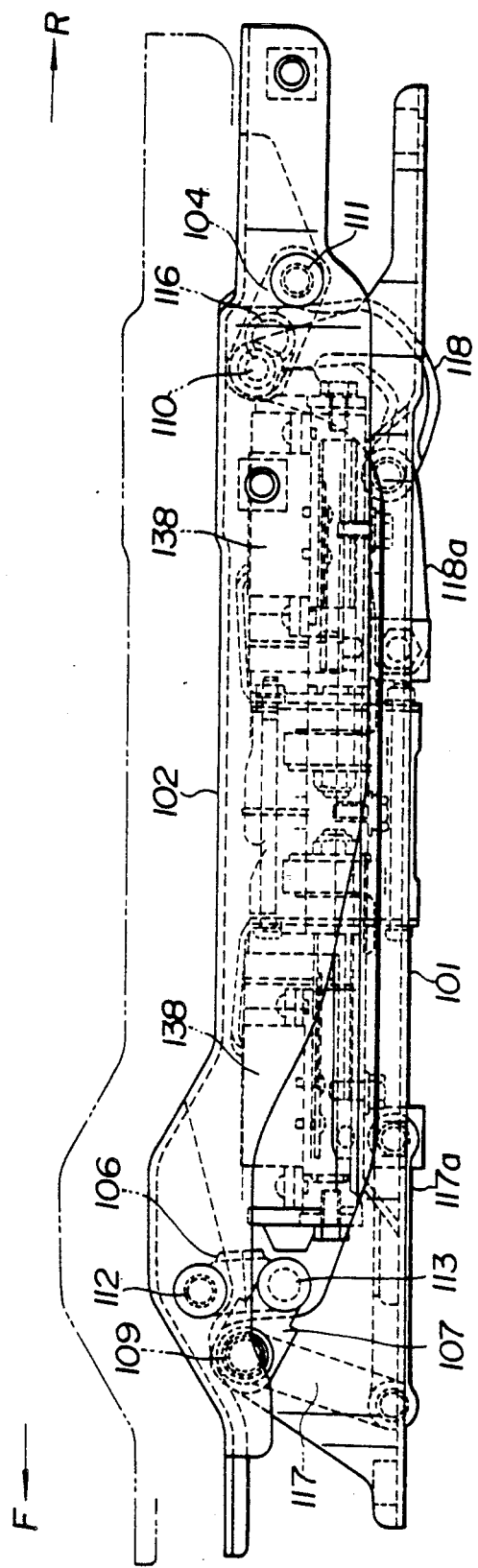
FIGS. 25 and 26 are left and right side elevations of the second embodiment of the power seat lifter device of FIG. 24.
Figure 26:
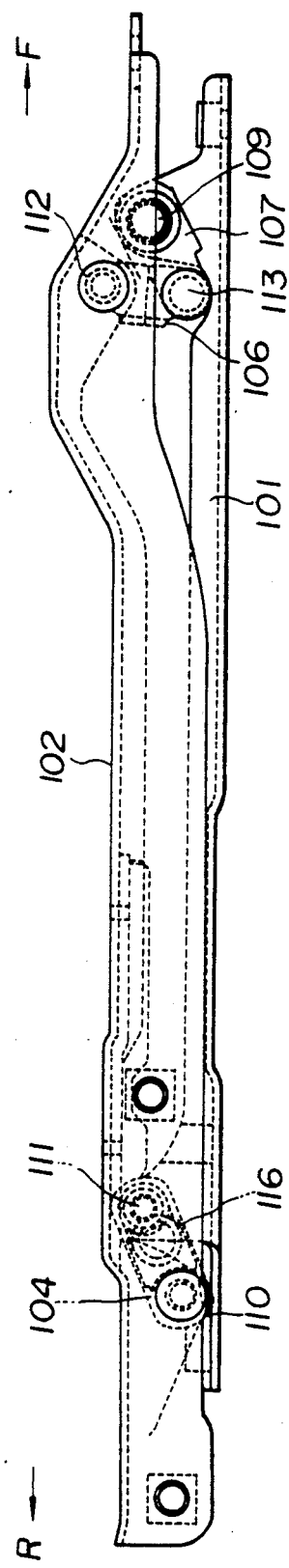
Figure 29:
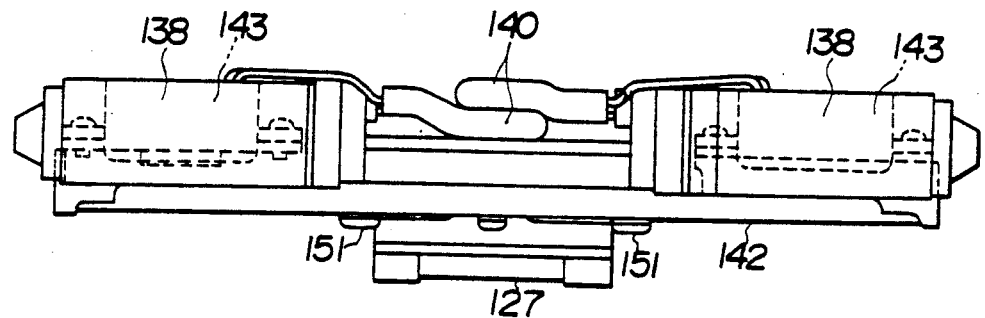
FIGS. 29 and 30 are front elevation and bottom view of the servo system in the second embodiment of the power seat lifter device.
Figure 30:
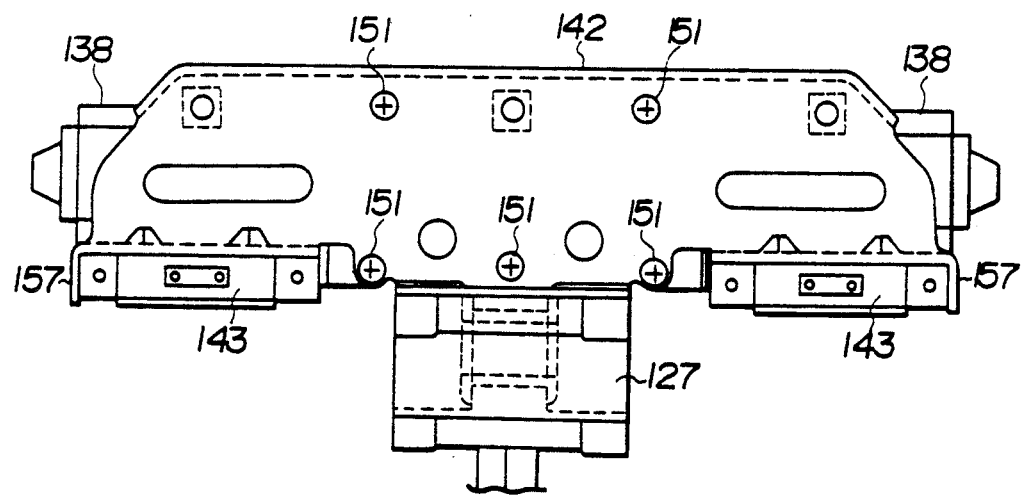

FIG. 23 briefly shows the relationship between the shown embodiment of the power seat lifter device and a seat slide assembly. As can be appreciated, the section illustrate in FIG. 23 corresponds to the section in FIG. 21. As can be seen, the leg bracket 1 is rigidly secured on an upper rail 70 of a seat slide mechanism. The upper rail 70 is slidingly associated with a lower rail 71 which is rigidly and stationarily secured on a vehicular floor 72. A slider assembly including sliders 73 and 74 is disposed within a space defined between the upper and lower rails 70 and 71. For the slide rail assembly of the upper and lower rails 70 and 71, buckle anchors 75 and 76 supporting a seat belt buckle (not shown) via a buckle strap 77 are engaged. As can be seen, the buckle strap 77 is rigidly connected to the buckle anchors 75 and 76 by means of fastening bolt 78 and a fastening nut 79. The pivot 15 extends across the leg bracket 1. To the extended end of the pivot 15, the link 4 and the actuation lever 9a are connected. On the other hand, the pivot 14 extends through the overlapping walls of the side bracket 2 and the link 4. To the extended end of the pivot 14, the actuation lever 9a and the connecting rod 8 are engaged. A reinforcement bracket 81 may be provided for supporting the pivot 14. The reinforcement bracket 81 is secured onto the side bracket 2 at the upper end and engaged to the pivot 14 at the lower end. The reinforcement bracket 81 is oriented in a transversely spaced relationship with the opposing side wall of the side bracket 2 for establishing a two point support for the pivot 14. In the shown position, the side bracket 2 supports a seat pan 80.

With the shown construction, even when local force F is exerted on the seat pan 80 which induces a downward force a' at the pivot 14, the pivot 15 supported by two support points in the leg bracket 1 may not be inclined. Furthermore, against the downward force a', an upward reacting force a" may be generated. This reacting force may subject on the pivot 14. However, with the shown construction, because of the short lever length of the pivot 14 and in the presence of the reinforcement bracket 81, the inclination of the pivot can be successfully prevented.

FIGS. 24 to 34 shows the second embodiment of the power seat lifter device, according to the present invention. In this embodiment, the outer and inner units OTR and INR respectively have leg brackets 101 which are mounted on outer and inner upper rails of seat slide mechanisms. Similarly to the foregoing embodiment, the leg brackets 101 are associated with side brackets 102 for forming the outer and inner units OTR and INR. As better shown in FIGS. 40 to 43, outer links 104 are provided between the rear ends of the leg brackets 101 and the side brackets 102. The outer links 104 are pivotable about pivots 110 and 111. Also, inner links 105 are provided for pivotal motion about the pivots 110 and 111, as shown in FIGS. 36 to 39. On the other hand, upper and lower links 106, 107 and 108 are provided between the front ends of the leg brackets 101 and the side brackets 102. The upper links 106 are pivotable about pivots 112. Outer and inner lower links 107 and 108 are pivotable about pivot 113. The outer and inner lower links 107 and 108 are rigidly secured on ends of a connecting rod 109 via welding sections 114. On the other hand, the inner links 105 are rigidly connected to both ends of a connecting rod 116 via welding section 114a.

To the connecting rods 109 and 116, levers 117 and 118 are welded. The levers 117 and 118 pivotably support actuation levers 117a and 118a in a pivotal fashion. Nut blocks 119 are connected to the actuation levers 117a and 118a by means of bolts and nuts 121. The nut blocks 119 are engaged with screw rods 125. The screw rods 125 have axial ends inserted into a gear box 127.

The end of the screw rods 125 are rotatably supported by bearing blocks 128. On the other hand, the front and rear ends of the screw rods 125 remote from the gear box 127 are supported by supporting brackets 148 which are, in turn supported on brackets 157 formed integrally with a cover plate 142.

Gears 129 are mounted on respective ends of the screw rods 125 inserted into the gear box 127. Respective of the gears 129 mesh with screw gears 132. The screw gears 132 are rotatably supported within the gear box 127 by means of gear shafts. Warm gears 137 are also mounted on the gear shafts 136 for co-rotation with the screw gear 132. The worm gears 137 are engaging with worm output shafts 139 of the electric servo motors 138. As in the former embodiment, the electric servo motors 138 are arranged in alignment with each other in an opposing relationship to each other.

Plates 131 are fitted in both sides of the gear box 127 and secured by means of a fastening bolt 126. The cover plate 142 is secured on the gear box 127 by means of a fastening bolt 151. On the other hand, the cover plate 142 is secured to the leg bracket 101 by means of fastening bolts 152 as shown in FIGS. 27 to 30.

Figure 31:
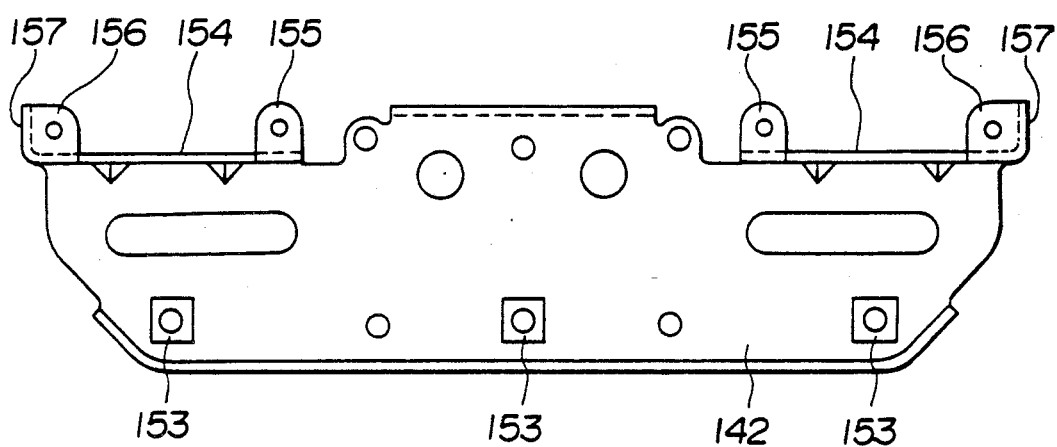
FIGS. 31, 32 and 33 are a plan view, a front elevation and a side elevation of a cover plate for protecting the servo system in the second embodiment of the power seat lifter device.
Figure 32:
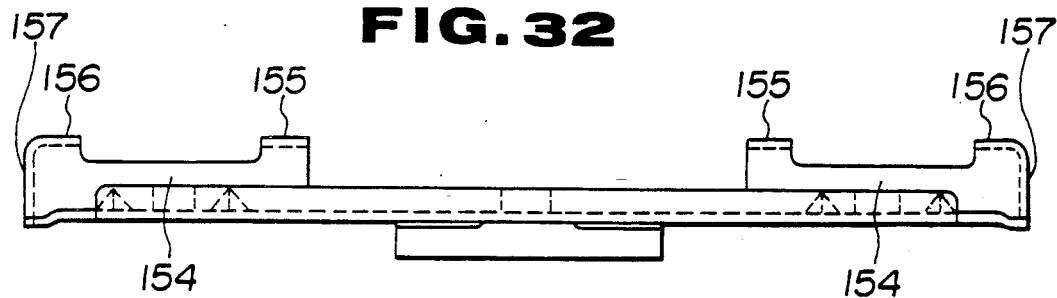
Figure 33:
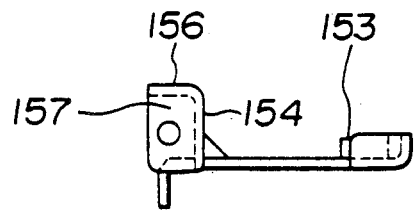
Figure 34:
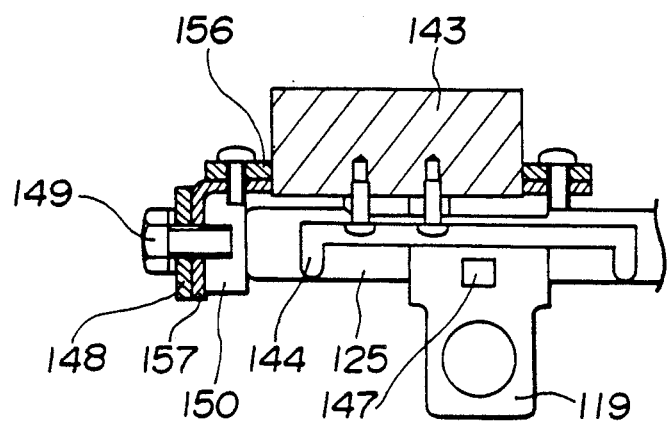
FIG. 34 is a section taken along line E—E of FIG. 27.
Figure 35:
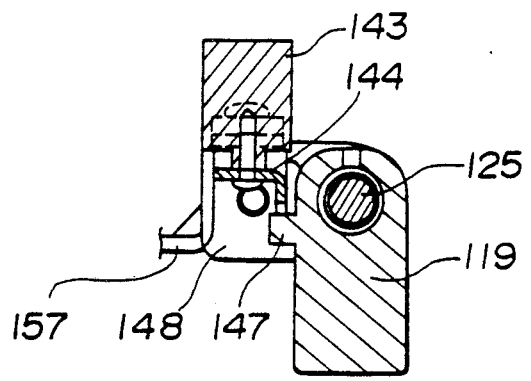
FIG. 35 is a section taken along line F—F of FIG. 27.
Figure 36:
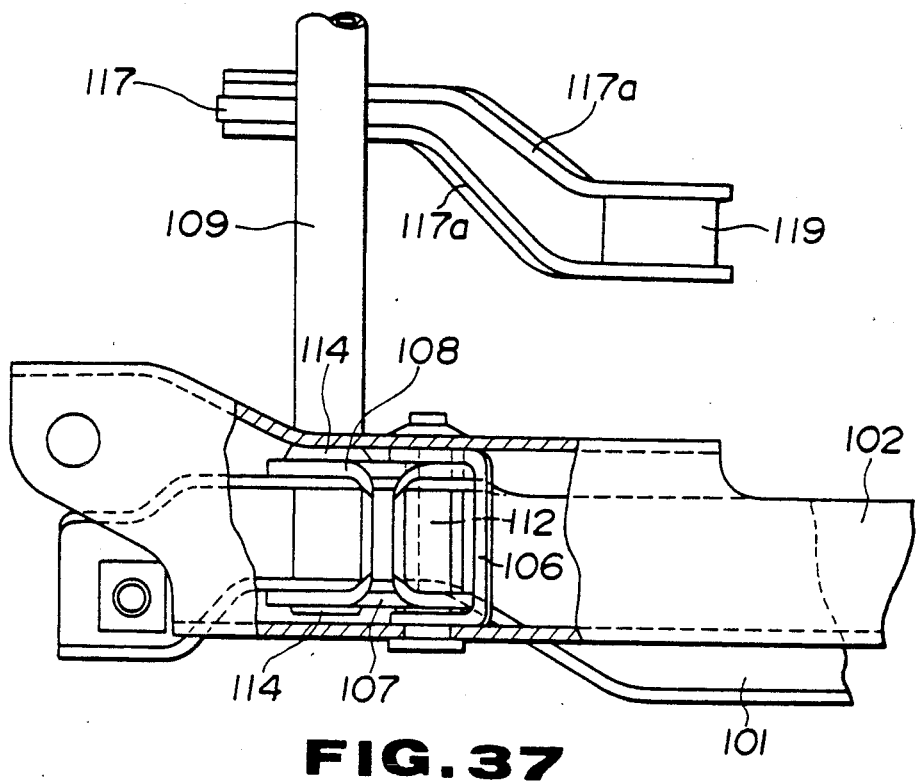
FIGS. 36 and 37 are an enlarged plan view and a side elevation of an outer front-side link mechanism employed in the second embodiment of the power seat lifter device of FIG. 24.
Figure 37:
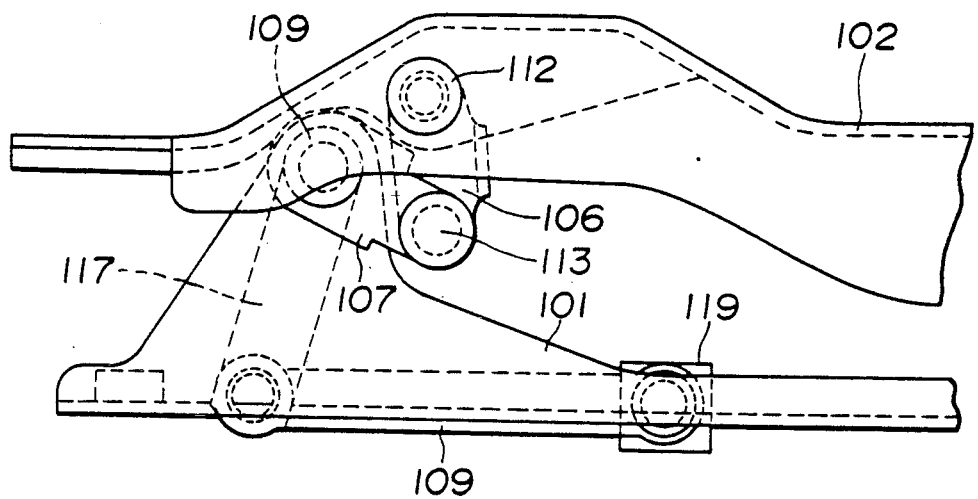
Figure 38:
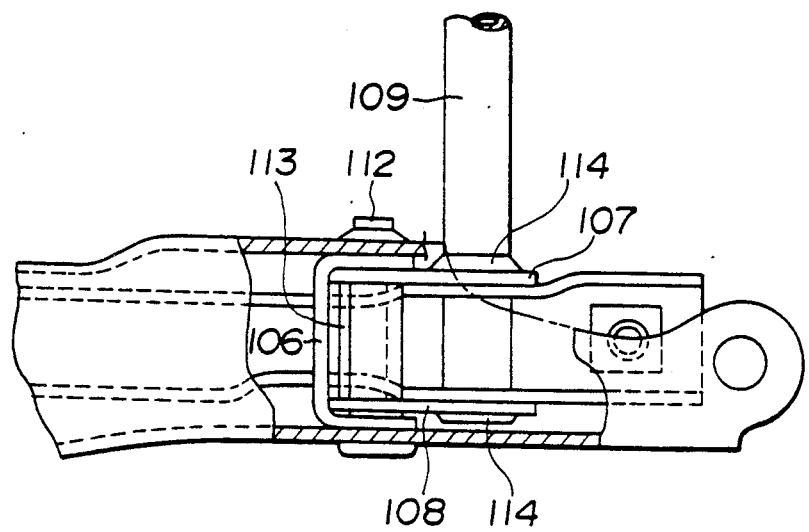
FIGS. 38 and 39 are an enlarged plan view and a side elevation of an inner front-side link mechanism employed in the second embodiment of the power seat lifter device of FIG. 24.
Figure 39:
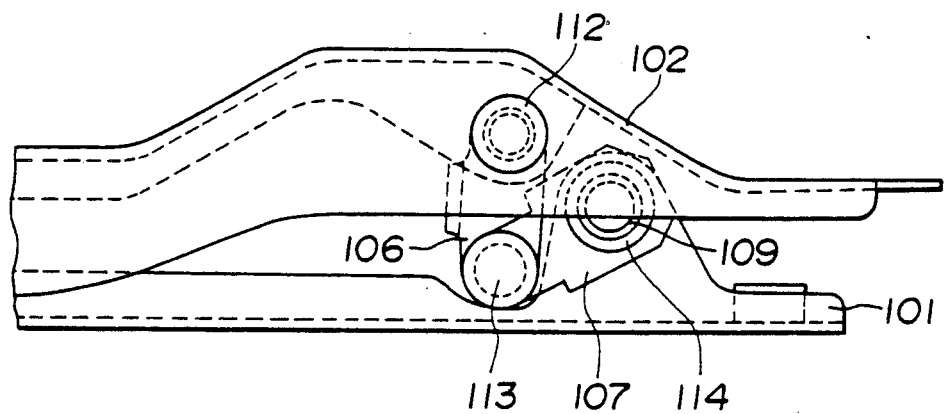
Figure 42:
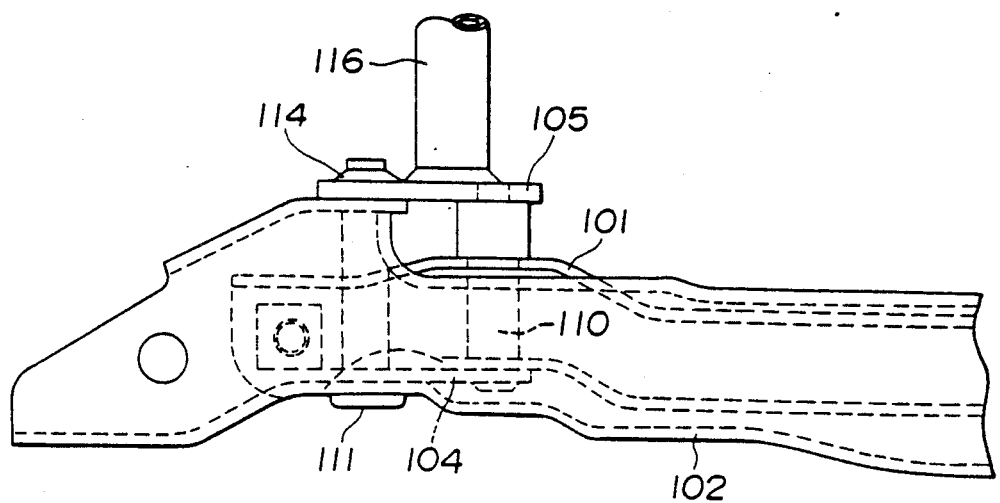
FIGS. 42 and 43 are an enlarged plan view and a side elevation of an inner rear-side link mechanism employed in the second embodiment of the power seat lifter device of FIG. 24.
Figure 43:
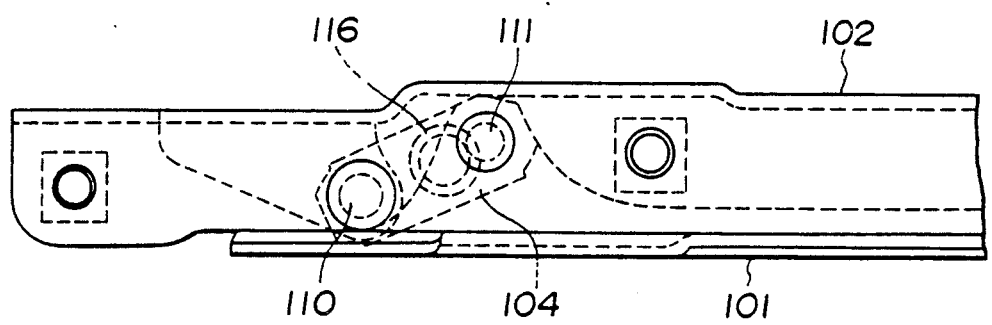

As shown in FIGS. 31 to 33, the cover plate 142 is fixed thereonto by weld nuts 153 to which the bolts 152 engage. Extension strips 154 are extended from the side of the cover plate opposite to the side where the weld nuts 153 are provided. The extension strips 154 are formed with brackets 155 and 156 for mounting limit switches 143 and the bracket 157 mounting the supporting brackets 148 which is secured by means of fastening bolts 149 and rotatably support the screw rods 125 via bearings 150. Actuation arms 144 of the limit switches 143 are arranged in a parallel relationship to the extension strips 154. As shown in FIG. 34, the actuation arms 144 are formed into an C-shaped configuration to define therebetween a clearance, into which projections 147 of the nut blocks 119 are to be inserted.

In the shown construction, when the electric servor motor 138 is driven, one of the nut blocks 119 associated with the screw rod 125 driven by the active motor is shifted frontwardly and rearwardly depending upon the driving direction of the motor. Accordingly, the links are pivotally driven to vary these at cushion height position. The operation of the shown embodiment is substantially equivalent to that discussed with respect to the former embodiment.

While the present invention has been discussed hereabove in terms of the preferred embodiment of the invention, the invention should be appreciated to be restricted for the shown embodiment. The invention can be embodied in various fashion. Therefore, the invention should be interpreted to include all possible embodiments and modifications which can be embodies without departing from the principle of the invention set out in the appended claims.

What is claimed is:

1. A power seat lifter device for an automotive seat assembly, comprising:
 a first bracket;
 a second bracket supporting a seat cushion assembly of the automotive seat assembly and vertically movable with said seat cushion assembly;
 a link mechanism provided between said first and second brackets and pivotally movable for causing vertical displacement of said second bracket and pivotably movable for causing vertical displacement of said second bracket relative to said first bracket, said link mechanism being provided at each transverse side of said automotive seat assembly for connecting said first and second brackets for cooperating therebetween;

an electric servo mechanism concentrically provided at a first transverse side of said automotive seat assembly for driving said link mechanism at the first transverse side where the electric servo mechanism is provided, for adjustment of the height position of said seat cushion assembly, said servo mechanism including:

an electric servo motor supported on said first bracket and oriented in a parallel relationship with said first and second brackets for generating driving torque for adjusting a vertical position of said second bracket relative to said first bracket and thus adjusting a height position of said seat cushion assembly;

a gear train associated with said electric servo motor and oriented in the vicinity of said first and second brackets, said gear train converting rotational torque of said electric servo motor into an axial thrusting force directed substantially in parallel to the longitudinal direction of said first and second brackets; and means for converting an axial thrusting force into a pivoting force for pivotally driving said link, and means for coupling said link mechanism on the second transverse side opposite to the first transverse side for driving said link mechanism on said second transverse side in unison with the action of said link mechanism on said first transverse side.

2. A power seat lifter device as set fort in claim 1, wherein said gear train includes a movement axially movable with said axial thrusting force, said movement being associated with said link mechanism for driving the latter for pivotal motion.

3. A power seat lifter device as set forth in claim 2, which further comprises a pair of limit switches respectively oriented in a path of said movement for defining front and rear ends of a motion stroke of said movement.

4. A power seat lifter device for an automotive seat assembly, comprising:

first and second units located at respective transverse sides of said automotive seat and extending longitudinally essentially in a parallel relationship to a longitudinal axis of an automotive vehicle, each of said first and second units including a first bracket, a second bracket supporting a seat cushion assembly of the automotive seat assembly and vertically movable with said seat cushion assembly, and a link mechanism provided between said first and second brackets and pivotally movable for causing vertical displacement of said second bracket relative to said first bracket;

an electric servo motor positioned in the vicinity of a first transverse side of said automotive seat assembly where said first unit is provided, supported on said first bracket of said first unit, and oriented in a parallel relationship with said first and second brackets for generating driving torque for adjusting a vertical position of said second bracket relative to said first bracket and thus adjusting a height portion of said seat cushion assembly;

a gear train positioned in the vicinity of said first transverse side, associated with said electric servo motor and oriented in the vicinity of said first and second brackets, said gear train converting rotational torque of said electric servo motor into an axial thrusting force directed substantially in parallel to the longitudinal direction of said first and second brackets; and means, positioned in the vicinity of said first transverse side, for converting said axial thrusting force into a pivoting force for pivotally driving said link; and a transverse member extending said first and second units positioned on a second transverse side opposite to said first transverse side, for driving said link mechanism in said second unit in synchronism with pivotal movement of said link unit in said first unit.

5. A power seat lifter device as set forth in claim 4, wherein said transverse member is rigidly connected to said link mechanisms in said first and second units for synchronous operation in both link mechanisms.

6. A power seat lifter device as set forth in claim 4, wherein link mechanism includes a link lever pivotable about a pivot supported at two support points.

7. A power seat lifter device as set forth in claim 5, wherein the connecting points at which said transverse member is connected to said link mechanisms of said first and second units at orientations defined by a hip space, necessary height from a seat cushion frame and a required leg space for rear seat.

8. A power seat lifter device for an automotive seat assembly, comprising:

first and second units located at respective transverse sides of said automotive seat and extending longitudinally essentially in a parallel relationship to a longitudinal axis of an automotive vehicle, each of said first and second units including a first bracket, a second bracket supporting a seat cushion assembly of the automotive seat assembly and vertically movable with said seat cushion assembly, and a link mechanism provided between said first and second brackets and pivotally movable for causing vertical displacement of said second bracket relative to said first bracket;

an electric servo motor supported on said first bracket of said first unit and oriented in a parallel relationship with said first and second brackets for generating driving torque for adjusting a vertical position of said second bracket relative to said first bracket and thus adjusting a height position of said seat cushion assembly;

a gear train associated with said electric servo motor and oriented in the vicinity of said first and second brackets, said gear train converting rotational torque of said electric servo motor into an axial thrusting force directed substantially in parallel to the longitudinal direction of said first and second brackets; said gear train comprising a longitudinally extending screw rod, a nut block engaging with said screw rod for thrusting motion according to rotation of said screw rod, a first intermediate gear rigidly connected to said screw rod for rotation therewith, a second intermediate gear meshing with said first intermediate gear, a third intermediate gear coaxial with said second intermediate gear for rotation therewith, a worm gear meshing with said third intermediate gear and also meshing with an wormed output shaft of said electric servo motor for transmitting rotational torque; and means for converting said axial thrusting force into a pivoting force for pivotally driving said link; and a transverse member extending between said first and second units for driving said link mechanism in said second unit in synchronism with pivotal movement of said link unit in said first unit.

9. A power seat lifter device as set forth in claim 8, wherein said gear train is generally housed within a gear housing and said screw rod is extended longitudinally from said gear housing.

10. A power seat lifter device as set forth in claim 8, wherein said transverse member is rigidly connected to said link mechanisms in said first and second units for synchronous operation in both link mechanism.

11. A power seat lifter device as set forth in claim 10, where the connecting points at which said transverse member is connected to said link mechanism of said first and second units at orientations defined by a hip space, a necessary height from a seat cushion frame, and a required leg space for a rear seat.

12. A power seat lifter device for an automotive seat assembly, comprising:
   first and second units located at respective transverse sides of aid automotive seat and extending longitudinally essentially in a parallel relationship to a longitudinal axis of an automotive vehicle, each of said first and second units including a first bracket, a second bracket supporting a set cushion assembly of the automotive seat assembly and vertically movable with said seat cushion assembly, and a link mechanism provided between said first and second brackets and pivotally movable for causing vertical displacement of said second bracket relative to said first bracket;
   first and second servo systems provided for each of said first units for adjusting a vertical position of said second bracket relative to said first bracket at front and rear end portions, said first servo system including
   an electric servo motor supported on said first bracket of said first unit and oriented in a parallel relationship with said first and second brackets for generating driving torque for adjusting vertical position of said second bracket relative to said first bracket and thus adjusting a height position of said seat cushion assembly;
   a gear train associate with said electric servo motor and oriented in the vicinity of said first and second brackets, said gear train converting rotational torque of said electric servo motor into an axial thrusting force directed substantially in parallel to the longitudinal direction of said first and second brackets; and
   means for converting said axial thrusting force into a pivoting force for pivotally driving said link; and
   said second servo system including a transverse member extending between said first and second units for driving said link mechanism in said second unit in synchronism with pivotal movement of said link unit in said first unit.

13. A power seat lifter device as set forth in claim 12, wherein said transverse members in said first and second servo systems are rigidly connected to said link mechanisms in said first and second units for synchronous operation of both link mechanisms.

14. A power seat lifter device as set forth in claim 13, wherein the connecting points at which said transverse member is connected to said link mechanisms of said first and second units at orientations defined by a hip space, necessary height from a seat cushion frame and a required leg space for rear seat.

15. A power seat lifter device a set forth in claim 12, wherein link mechanism includes a link lever pivotable about a pivot supported at two support points.

16. A power seat lifter device for an automotive seat assembly, comprising:
   first and second units located at respective transverse sides of said automotive seat and extending longitudinally essentially in parallel relationship to a longitudinal axis of an automotive vehicle, each of said first and second units including a first bracket, a second bracket supporting a seat cushion assembly of the automotive seat assembly and vertically movable with said seat cushion assembly, and a link mechanism provided between said first and second brackets and pivotally movable for causing vertical displacement of said second bracket relative to said first bracket;
   first and second servo system provided for each of said first units for adjusting a vertical position of said second bracket relative to said first bracket at front and rear end portions, said first servo system including
   an electric servo motor supported on said first bracket of said first unit and oriented in a parallel relationship with said first and second brackets for generating driving torque for adjusting vertical position of said second bracket relative to said first bracket and thus adjusting a height position of said seat cushion assembly;
   a gear train associated with said electric servo motor and oriented in the vicinity of said first and second brackets, said gear train converting rotational torque of aid electric servo motor into an axial thrusting force directed substantially in parallel to the longitudinal direction of said first and second brackets said gear train comprising a longitudinally extending screw rod, a nut block engaging with aid screw rod for thrusting motion according to rotation of said screw rod a first intermediate gear rigidly connected to said screw rod for rotation therewith, a second intermediate gear meshing with said first intermediate gear, a third intermediate gear coaxial with said second intermediate gear for rotation therewith, a warm gear meshing with aid third intermediate gear and also meshing with an warmed output shaft of said electric servo motor for transmitting rotational torque; and
   means for converting said axial thrusting force into pivoting force for pivotally driving said link; and
   said second servo system including a transverse member extending between said first and second units for driving said link mechanism in said second unit in synchronism with pivotal movement of said link unit in said first unit.

17. A power seat lifter device as set forth in claim 16, wherein said gear train is generally housed within a gear housing, and said screw rod is extended longitudinally from said gear housing.

18. A power seat lifter device as set forth in claim 16 wherein said transverse members in said first and second servo systems are rigidly connected to said link mechanisms in said first and second units for synchronous operation of both link mechanisms.

19. A power seat lifter device as set forth in claim 18, wherein the connecting points at which said transverse member is connected to aid link mechanisms of said first and second units at orientations defined by a hip space, a necessary height from a seat cushion frame, and a required leg space for a rear seat.

20. A power seat lifter device for an automotive set assembly, comprising:

a first bracket;

a second bracket supporting a seat cushion assembly of the automotive seat assembly and vertically movable with said set cushion assembly;

a link mechanism provided between said first and second brackets and pivotally movable for causing vertical displacement of said second brackets and pivotably movable for causing vertical displacement of said second bracket relative to said first bracket;

an electric servo motor supported on said firs bracket and oriented in a parallel relationship with said first and second brackets for generating driving toque for adjusting a vertical position of said second bracket relative to said first bracket and thus adjusting a height position of said seat cushion assembly;

a gear train associated with aid electric servo motor and oriented in the vicinity of said first and second brackets, said gear train converting rotational torque of said electric servo motor into axial thrusting force directed substantially in parallel to the longitudinal direction of said first and second brackets, said gear train comprising a longitudinally extending screw rod, a hut block engaging with said screw rod for thrusting motion according to rotation of said screw rod, a first intermediate gear rigidly connected to said screw rod for rotation therewith, a second intermediate gear meshing with said first intermediate gear, a third intermediate gear coaxial with said second intermediate gear for rotation therewith, a warm gear meshing with said third intermediate gear and also meshing with an warmed output shaft of said electric servo motor for transmitting rotational torque; and means for converting an axial thrusting force into pivoting force for pivotally driving said link.

* * * * *